(12) United States Patent
Fujii et al.

(10) Patent No.: US 12,345,675 B2
(45) Date of Patent: Jul. 1, 2025

(54) GAS SENSOR ELEMENT

(71) Applicant: DENSO CORPORATION, Kariya (JP)

(72) Inventors: Tomofumi Fujii, Kariya (JP); Makoto Noguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 410 days.

(21) Appl. No.: 17/888,671

(22) Filed: Aug. 16, 2022

(65) Prior Publication Data
US 2022/0390410 A1    Dec. 8, 2022

Related U.S. Application Data

(63) Continuation of application No. PCT/JP2021/002193, filed on Jan. 22, 2021.

(30) Foreign Application Priority Data

Feb. 17, 2020    (JP) ................. 2020-024017

(51) Int. Cl.
*G01N 27/406* (2006.01)
*G01N 27/407* (2006.01)
*G01N 27/41* (2006.01)
*G01N 27/417* (2006.01)

(52) U.S. Cl.
CPC ..... *G01N 27/4067* (2013.01); *G01N 27/4071* (2013.01); *G01N 27/41* (2013.01); *G01N 27/417* (2013.01)

(58) Field of Classification Search
CPC .......... G01N 27/4067; G01N 27/4071; G01N 27/41; G01N 27/417
See application file for complete search history.

(56) References Cited

U.S. PATENT DOCUMENTS

| 4,650,560 | A | 3/1987 | Ueno |
| 5,895,591 | A * | 4/1999 | Kojima ............... G01N 27/4067 204/426 |
| 6,156,176 | A | 12/2000 | Sugiyama et al. |
| 2001/0015193 | A1* | 8/2001 | Tanaka ................ F02D 41/0055 123/568.21 |

(Continued)

FOREIGN PATENT DOCUMENTS

| EP | 0167297 A2 * | 8/1986 | ............. G01N 27/56 |
| EP | 0862056 | 9/1998 | |

(Continued)

*Primary Examiner* — Alexander S Noguerola
(74) *Attorney, Agent, or Firm* — Nixon & Vanderhye P.C.

(57) ABSTRACT

A limiting current-type gas sensor element including a plurality of stacked ceramic layers and configured to output a limiting current value which depends on a concentration of a specific gas in a gas to be measured when a certain voltage is applied. The gas sensor element includes a solid electrolyte member having oxygen ion conductivity; a heater that heats the solid electrolyte member; a measurement electrode and a reference electrode provided on the solid electrolyte member; a chamber facing the measurement electrode and into which the gas to be measured is introduced; a gas inlet located to a tip side of the chamber in a longitudinal direction; and a diffusion resistance part provided in the gas inlet. A heating center of the heater is located further to the tip side than an electrode center of the measurement electrode is.

10 Claims, 22 Drawing Sheets

(56) References Cited

U.S. PATENT DOCUMENTS

| | | | |
|---|---|---|---|
| 2004/0040845 A1 | 3/2004 | Okuno | |
| 2005/0029250 A1* | 2/2005 | Niwa | F02D 41/1494 |
| | | | 219/494 |
| 2009/0250344 A1 | 10/2009 | Ohya et al. | |
| 2017/0122897 A1 | 5/2017 | Kawamoto et al. | |
| 2017/0261463 A1 | 9/2017 | Sugiura et al. | |
| 2017/0370874 A1* | 12/2017 | Nakatou | G01N 27/12 |
| 2018/0364193 A1* | 12/2018 | Mizutani | G01N 27/4163 |
| 2019/0391109 A1 | 12/2019 | Hagino et al. | |
| 2021/0318262 A1 | 10/2021 | Kuroki et al. | |

FOREIGN PATENT DOCUMENTS

| | | |
|---|---|---|
| JP | S62-113057 | 5/1987 |
| JP | H11-326269 | 11/1999 |
| JP | 2000-105214 | 4/2000 |
| JP | 2003-149199 | 5/2003 |
| JP | 2004-093250 | 3/2004 |
| JP | 2004-340861 | 12/2004 |
| JP | 2008-006685 | 1/2008 |
| JP | 2009-287939 | 12/2009 |
| JP | 2010-145133 | 7/2010 |
| JP | 2010-271283 | 12/2010 |
| JP | 2015-052587 | 3/2015 |
| JP | 2017-106874 | 6/2017 |
| JP | 2018-128463 | 8/2018 |
| JP | 2019-203834 | 11/2019 |
| JP | 2020-3471 | 1/2020 |

\* cited by examiner

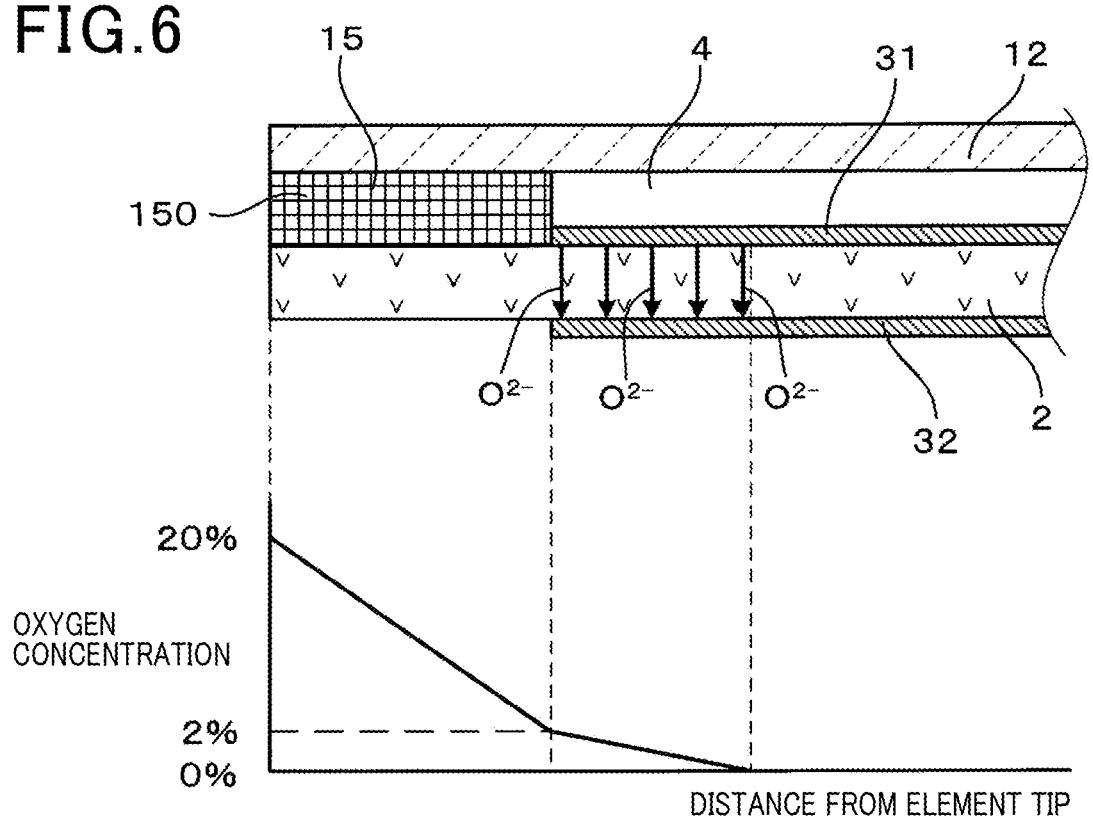
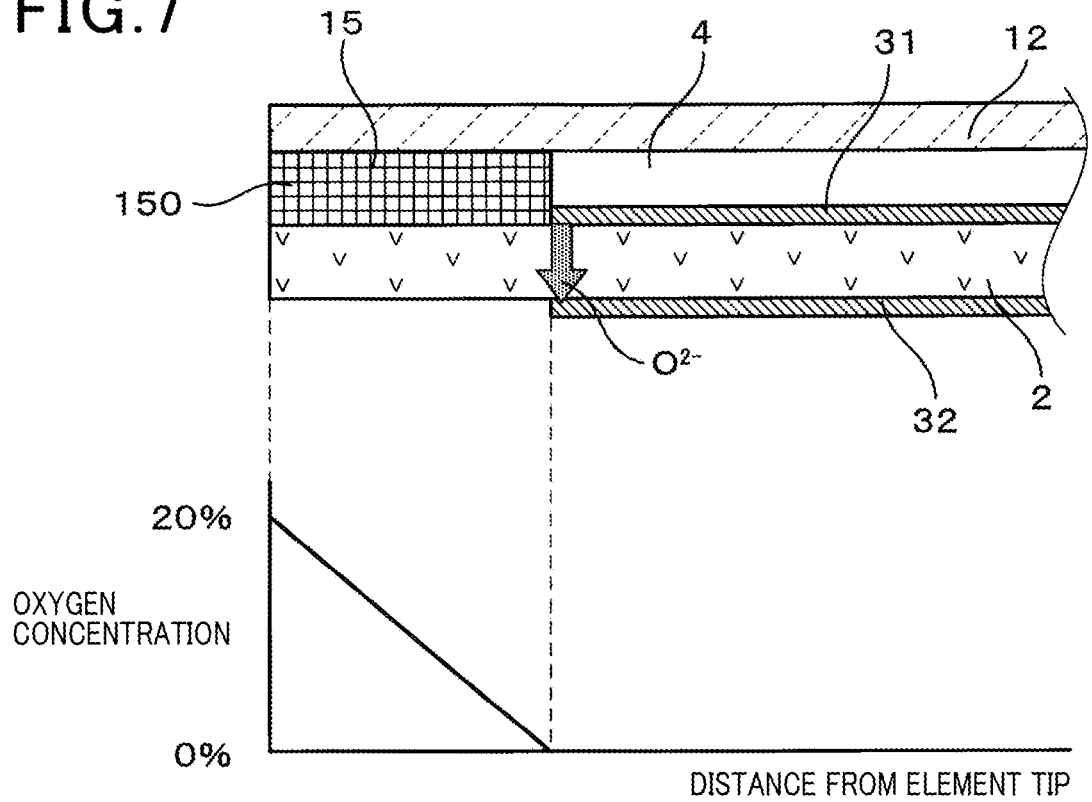

GAS SENSOR ELEMENT

CROSS-REFERENCE TO RELATED APPLICATION

This application is the U.S. bypass application of International Application No. PCT/JP2021/002193 filed on Jan. 22, 2021 which designated the U.S. and claims priority to Japanese Patent Application No. 2020-24017, filed on Feb. 17, 2020, the contents of both of which are incorporated herein by reference.

TECHNICAL FIELD

The present disclosure relates to a laminated gas sensor element.

BACKGROUND

One kind of gas sensor element for detecting the concentration of a specific gas in the gas to be measured is configured to output a limiting current value which is the value of current generated when a certain voltage is applied between the measurement electrode and the reference electrode. In such a limiting current-type gas sensor element, a relational curve between the applied voltage and the output current (hereinafter referred to as a VI curve) is determined according to the concentration of the specific gas in the gas to be measured. In a certain applied voltage range, the VI curve has a flat part in which the output current value hardly changes even when the applied voltage changes. The concentration of the specific gas in the gas to be measured can be detected based on the limiting current value which is the current value in this flat part. In general, the current value in the flat part is preferably as constant as possible, and a state in which the current value changes as little as possible depending on the applied voltage is desired. A measure of how little the output current changes in the flat part depending on the applied voltage is called flatness.

Further, in the gas sensor element, the part of the solid electrolyte member forming a sensor cell is heated to a certain temperature so as to activate it and allow conduction of oxygen ions, which makes it possible to measure the concentration of the specific gas. To that end, the gas sensor element has a heater for heating the solid electrolyte member.

JP 2016-20894 A discloses an example of a laminated gas sensor element formed by stacking a plurality of ceramic layers. The gas sensor element is configured to introduce the gas to be measured into a chamber from the tip side in the longitudinal direction of the element.

SUMMARY

One aspect of the present disclosure resides in a limiting current-type gas sensor element including a plurality of stacked ceramic layers and configured to output a limiting current value which depends on a concentration of a specific gas in a gas to be measured when a certain voltage is applied, the gas sensor element includes a solid electrolyte member having oxygen ion conductivity, a heater that heats the solid electrolyte member, a measurement electrode and a reference electrode provided on the solid electrolyte member, a chamber facing the measurement electrode and into which the gas to be measured is introduced, a gas inlet located to a tip side of the chamber in a longitudinal direction of the gas sensor element, and a diffusion resistance part provided in the gas inlet. A heating center of the heater is located further to the tip side than an electrode center of the measurement electrode is.

BRIEF DESCRIPTION OF THE DRAWINGS

The above features of the present disclosure will be made clearer by the following detailed description, given referring to the appended drawings. In the accompanying drawings:

FIG. 6 is a schematic diagram showing how oxygen ion currents move in a gas sensor element of a comparative example, and a diagram showing the distribution of oxygen concentration in a chamber;

FIG. 7 is a schematic diagram showing how an oxygen ion current moves in the gas sensor element of the first embodiment, and a diagram showing the distribution of oxygen concentration in the chamber;

DETAILED DESCRIPTION OF THE PREFERRED EMBODIMENTS

Figure 1:
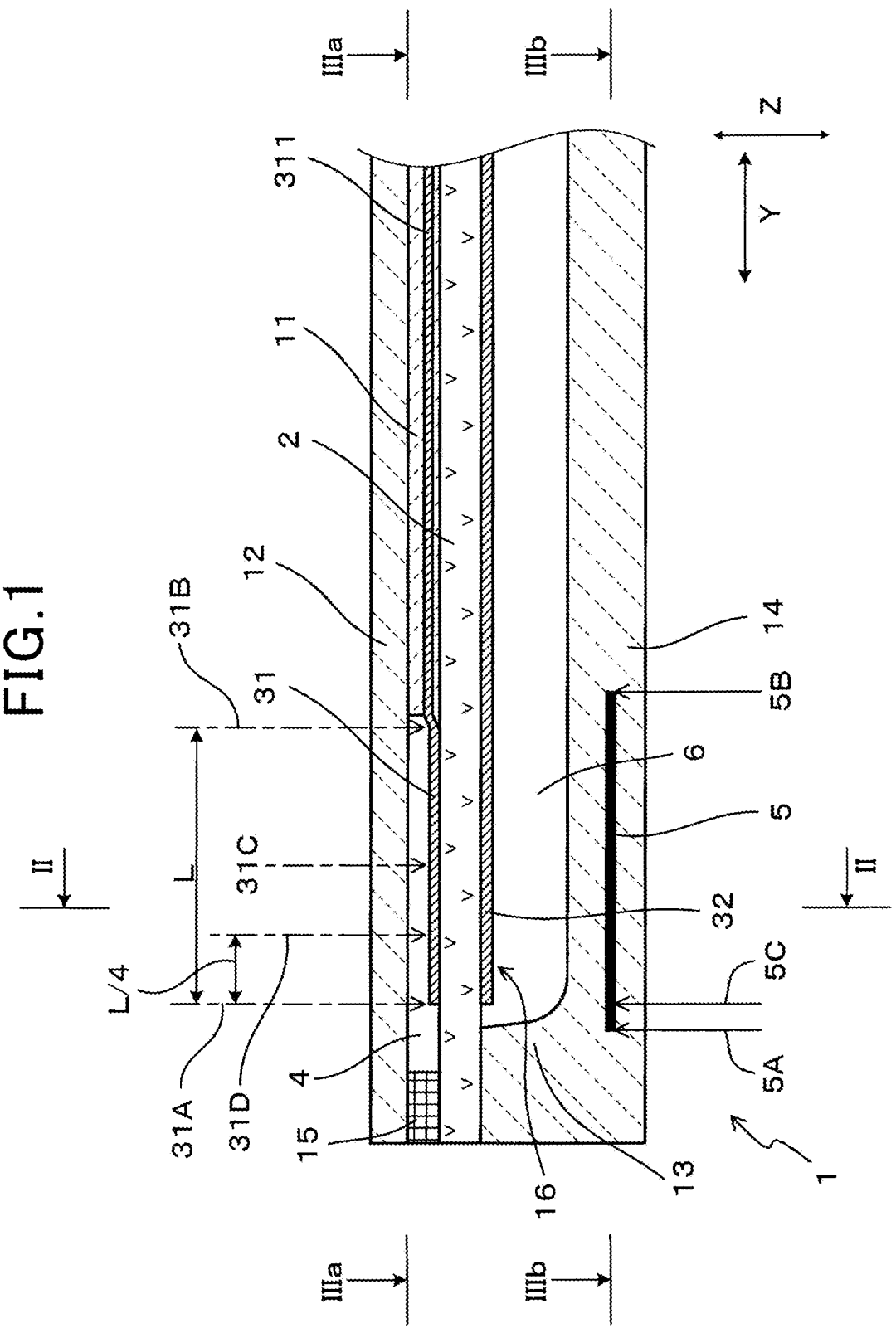
FIG. 1 is a cross-sectional view of a gas sensor element according to a first embodiment.

The gas sensor element configured to introduce the gas to be measured into the chamber from the tip side has the following problem.

That is, after being introduced into the chamber from the tip side, the gas to be measured first reaches the vicinity of the tip part of the measurement electrode. However, if the temperature of the solid electrolyte member near the tip part of the measurement electrode is not high enough, the oxygen ion conductivity of this part may be low. In such a case, there may be variation in the concentration of the specific gas inside the chamber, which makes it difficult to secure good flatness. When the flatness is low, there tends to be differences in the output current depending on the applied voltage, and therefore there tends to be measurement errors.

An object of the present disclosure is to provide a gas sensor element having good flatness.

One aspect of the present disclosure resides in a limiting current-type gas sensor element including a plurality of stacked ceramic layers and configured to output a limiting current value which depends on a concentration of a specific gas in a gas to be measured when a certain voltage is applied, the gas sensor element includes a solid electrolyte member having oxygen ion conductivity, a heater that heats the solid electrolyte member, a measurement electrode and a reference electrode provided on the solid electrolyte member, a chamber facing the measurement electrode and into which the gas to be measured is introduced, a gas inlet located to a tip side of the chamber in a longitudinal direction of the gas sensor element, and a diffusion resistance part provided in the gas inlet. A heating center of the heater is located further to the tip side than an electrode center of the measurement electrode is.

In the gas sensor element, the heating center of the heater is located further to the tip side than the electrode center of the measurement electrode is. Therefore, it is easier to sufficiently increase the temperature of the solid electrolyte member near the tip part of the measurement electrode. This means that the part of the solid electrolyte member near the tip part of the measurement electrode can be activated sufficiently. As a result, the gas to be measured introduced into the chamber from the gas inlet located on the tip side via the diffusion resistance part can be treated sufficiently in the vicinity of the tip part of the measurement electrode. That is, the specific gas component that has reached the vicinity of the tip part of the measurement electrode can be treated at a sufficient rate and transported to the reference electrode side through the solid electrolyte member as oxygen ions.

This allows the gas sensor element to have good flatness even when the gas to be measured is introduced into the chamber from the tip side.

As can be seen from the above, according to this aspect, a gas sensor element having good flatness can be provided.

First Embodiment

An embodiment related to a gas sensor element will be described with reference to FIGS. 1 to 5.

The gas sensor element 1 of this embodiment is formed by stacking a plurality of ceramic layers. Further, the gas sensor element 1 of this embodiment is a limiting current type gas sensor element. That is, the gas sensor element 1 is configured to output a limiting current value which depends on the concentration of a specific gas in the gas to be measured when a certain voltage is applied.

Figure 2:
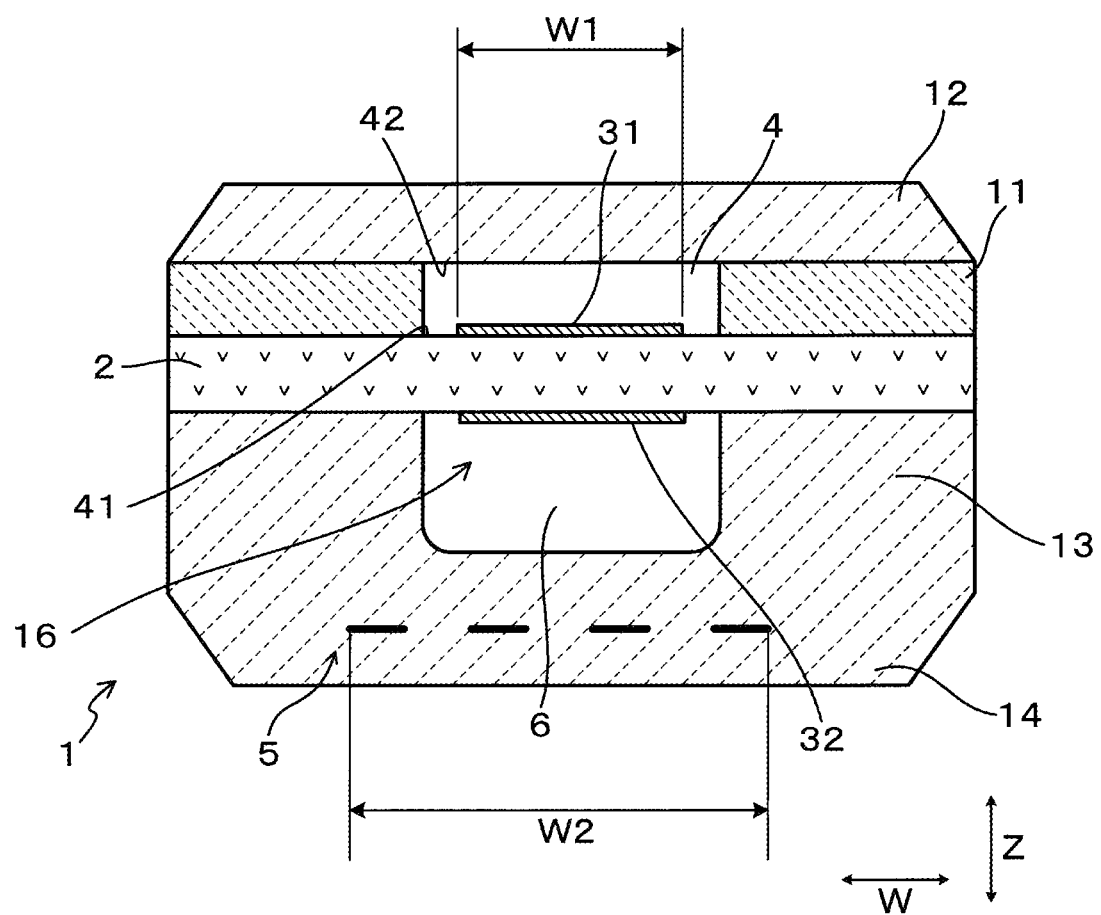
FIG. 2 is a cross-sectional view taken along line II-II shown in FIG. 1 as viewed in the direction indicated by the arrows.

As shown in FIGS. 1 to 3, the gas sensor element 1 includes a solid electrolyte member 2, a heater 5, a measurement electrode 31, a reference electrode 32, a chamber 4, a gas inlet 150, and a diffusion resistance part 15.

The solid electrolyte member 2 has oxygen ion conductivity. The heater 5 heats the solid electrolyte member 2. The measurement electrode 31 and the reference electrode 32 are provided on the solid electrolyte member 2. The chamber 4 is a space facing the measurement electrode 31 and into which the gas to be measured is introduced. The gas inlet 150 is provided to the tip side of the chamber 4 in the longitudinal direction Y of the gas sensor element 1. The gas inlet 150 is provided with a diffusion resistance part 15.

As shown in FIGS. 1 and 3, a heating center 5C of the heater 5 is located further to the tip side than an electrode center 31C of the measurement electrode 31 is. Here, the heating center 5C of the heater 5 can be defined as the part with the highest temperature when the heater 5 is energized so that the temperature of the part with the highest temperature is stabilized at 700° C.

Figure 4:
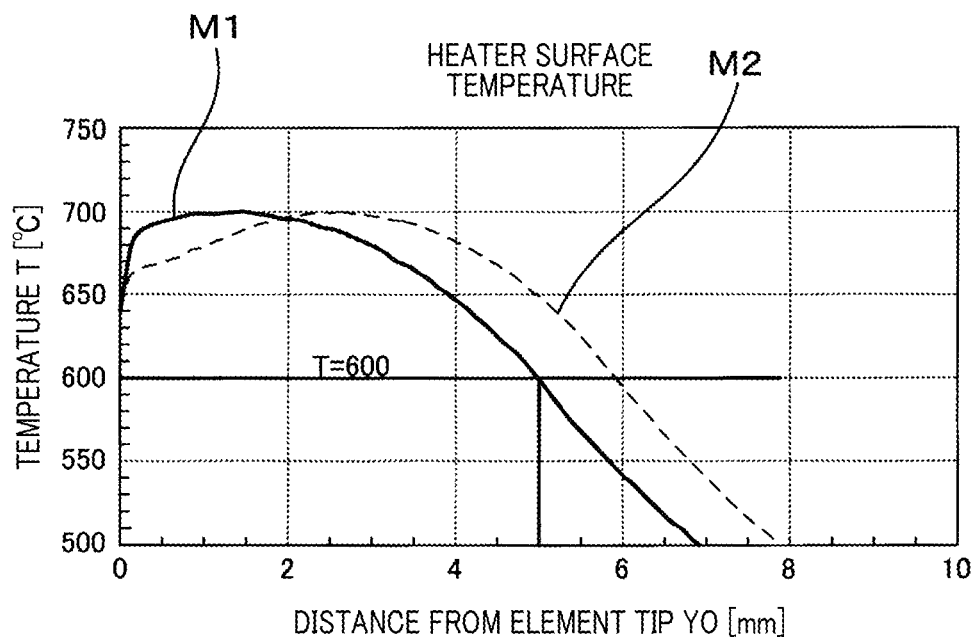
FIG. 4 is a diagram showing the heater temperature distribution in the longitudinal direction.

That is, as shown in FIG. 4, the temperature of the heater 5 differs depending on the position Y0 in the longitudinal direction Y and has a certain distribution. Even when the temperature of the part with the highest temperature of the heater 5 is stabilized at 700° C., the temperature of the rest of the heater 5 is lower than 700° C. Therefore, the position in the longitudinal direction Y at which the temperature is highest when the heater 5 is heated so that the temperature of the part with the highest temperature is stabilized at 700° C. is defined as the heating center 5C.

The horizontal axis of FIG. 4 indicates a distance Y0 from the tip of the gas sensor element 1 in the longitudinal direction Y, and the vertical axis indicates the temperature T. A curve M1 in the figure shows the temperature distribution of the heater 5 of the gas sensor element 1 of the present embodiment. A curve M2 in the figure shows the temperature distribution of the heater 5 of a gas sensor element 9 of a comparative example described later.

The above-mentioned temperature of 700° C. of the part with the highest temperature of the heater 5 is merely a temperature for defining the heating center 5C of the heater 5, and does not specify the temperature while the gas sensor element 1 is being used. When the gas sensor element 1 is used, the temperature of the part with the highest temperature can be set as appropriate. The temperature of the part with the highest temperature while the gas sensor element 1 is being used can be set as appropriate, for example, in the range of 600° C. to 950° C.

The temperature of the heater 5 is obtained by using thermography to measure the temperature of the main face of the gas sensor element 1, which is the face on the heater 5 side in a stacking direction Z (in this embodiment, the main face of a heater layer 14 described later). In a case where the gas sensor element 1 is covered with a porous layer (for example, a trap layer for capturing a poisonous substance), the porous layer is peeled off to expose the dense ceramic layer, and temperature measurement is performed after that.

The gas sensor element 1 has a long and narrow shape, and the measurement electrode 31 and reference electrode 32 are formed near one end thereof in the longitudinal direction Y. In the longitudinal direction Y, the side on which the measurement electrode 31 and the reference electrode 32 are provided is referred to as the tip side, and the opposite side is referred to as the base end side. Further, the direction orthogonal to both the longitudinal direction Y and the stacking direction Z is referred to as a width direction W.

As shown in FIGS. 1 and 3, in this embodiment, the heating center 5C of the heater 5 is located further to the tip side than a position 31D is, which is located L/4 from the base end side of a tip 31A of the measurement electrode 31. L is the total length of the measurement electrode 31 in the longitudinal direction Y.

A tip 5A of the heater 5 is located further to the tip side than the tip 31A of the measurement electrode 31 is. Note that, in this embodiment, the temperature of the tip 5A of the heater 5 is 600° C. or higher when the temperature of the heating center 5C is maintained at 700° C.

A heating base end part 5B of the heater 5 is located further to the base end side than a base end 31B of the measurement electrode 31 is. The heating base end part 5B is the part located furthest to the base end side in the section of the heater 5 that has a temperature of 600° C. or higher when the temperature of the heating center 5C is maintained at 700° C.

That is, in FIG. 4, the distance Y1 of the point at which the curve M1 intersects the straight line T=600 corresponds to the distance of the heating base end part 5B from the element tip.

In the gas sensor element 1 of the present embodiment, as shown in FIGS. 1 and 2, a chamber forming layer 11 and a shield layer 12 are sequentially stacked on the face of the solid electrolyte member 2 on which the measurement electrode 31 is provided. Further, a duct forming layer 13 and a heater layer 14 are sequentially stacked on the face of the solid electrolyte member 2 on which the reference electrode 32 is provided.

Figure 3A:
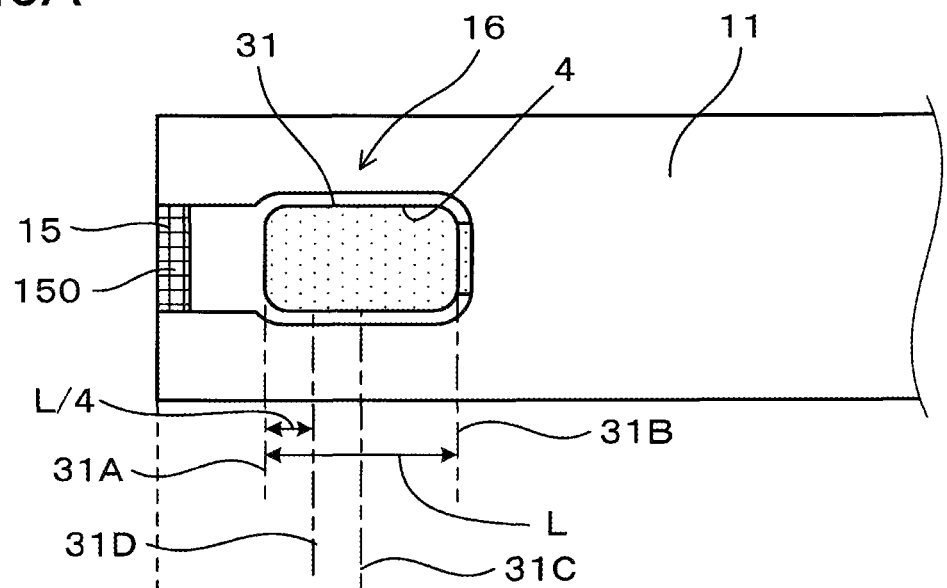
FIG. 3A is a cross-sectional view taken along line IIIa-IIIa shown in FIG. 1, as viewed in the directions indicated by the arrows.

The chamber forming layer 11 is a ceramic layer formed so as to surround the chamber 4 from a direction orthogonal to the stacking direction Z. The space surrounded by the chamber forming layer 11, the solid electrolyte member 2, and the shield layer 12 forms the chamber 4. As shown in FIGS. 1 and 3(a), the diffusion resistance part 15 is provided in the chamber forming layer 11. The diffusion resistance part 15 is a part for diffusing the gas to be measured while introducing it into the chamber 4.

The tip part of the gas sensor element 1 is formed with the gas inlet 150. The opening of the gas inlet 150 is facing the tip side of the gas sensor element 1. The diffusion resistance part 15 is provided in the gas inlet 150. That is, the diffusion resistance part 15 is located at the tip side of the chamber 4. The diffusion resistance part 15 is made of a porous ceramic. Therefore, the gas to be measured can be introduced into the chamber 4 from the tip side of the element.

As shown in FIGS. 1 and 2, the duct forming layer 13 is a ceramic layer formed so as to surround a duct 6 from a direction orthogonal to the stacking direction Z and from the side opposite to the solid electrolyte member 2. However, the duct forming layer 13 does not block the base end side of the duct 6. The duct 6 is connected to an opening in the base end part of the gas sensor element 1. This allows the reference gas to be introduced into the duct 6 from the base end side of the gas sensor element 1. The reference gas comes into contact with the reference electrode 32 facing the duct 6. In this embodiment, the reference gas is atmospheric air.

The solid electrolyte member 2 is a ceramic layer whose main component is zirconia. The chamber forming layer 11, the shield layer 12, the duct forming layer 13, and the heater layer 14 are all ceramic layers whose main component is alumina. The main component of the diffusion resistance part 15 is also alumina. However, it is made of a porous ceramic member in order to allow the gas to be measured to pass through.

Figure 3B:
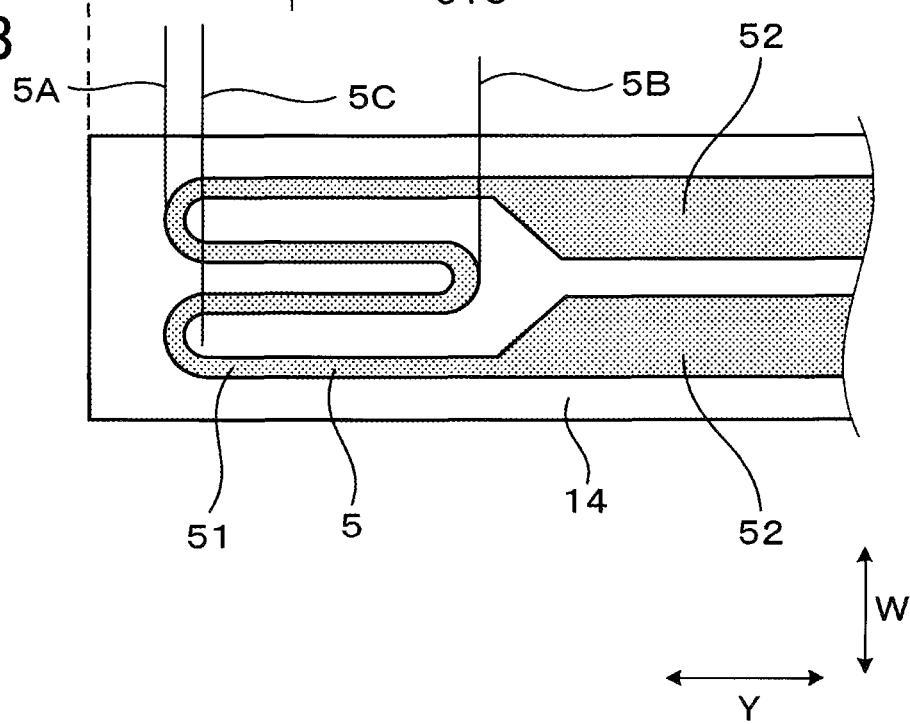
FIG. 3B is a cross-sectional view taken along line IIIb-IIIb shown in FIG. 1, as viewed in the directions indicated by the arrows.

The heater 5 is formed on the heater layer 14. That is, a heater pattern is formed on the surface of the heater layer 14 on the duct forming layer 13 side. As shown in FIG. 3(b), the heater 5 has a heater heating part 51 and a heater lead part 52. The heater lead part 52 is connected to the base end side of the heater heating part 51 and extends to the base end side. The conduction resistance of the heater heating part 51 is higher than that of the heater lead part 52. Therefore, when the heater 5 is energized, it is the heater heating part 51 that mainly generates heat.

In this embodiment, the heater heating part 51 is folded twice on the tip side and once on the base end side. The heating center 5C of the heater 5 is located near the tip of the heater heating part 51. Part of the heat of the heater heating part 51 is released through the heater lead part 52 connected to the base end side. Further, the part of the gas sensor element 1 to the tip side of the heater heating part 51 has a relatively small volume. That is, the heat capacity of the part to the tip side of the heater heating part 51 is relatively small. Due to such factors, the heating center 5C is located near the tip of the heater heating part 51.

The gas sensor element 1 is formed by stacking a plurality of ceramic layers, but in some cases, there may be no boundaries between the ceramic layers in the finished product. For example, the boundary between the chamber forming layer 11 and the shield layer 12 and the boundary between the duct forming layer 13 and the heater layer 14 may not exist.

As described above, the gas sensor element 1 has the duct 6 facing the reference electrode 32 (see FIGS. 1 and 2). The gas sensor element 1 of the present embodiment is configured such that the oxygen in the chamber 4 is pumped into the duct 6 by a sensor cell 16 composed of the solid electrolyte member 2, the measurement electrode 31, and the reference electrode 32.

The gas sensor element 1 of this embodiment is an A/F sensor element. That is, the gas to be measured is the exhaust gas of an internal combustion engine that burns a mixture of air and fuel. The mixing ratio of air and fuel in the air-fuel mixture can be measured based on the limiting current value.

For example, the gas sensor element 1 of this embodiment is provided in an exhaust system of an internal combustion engine of a vehicle. The gas sensor element 1 is incorporated into a gas sensor including components such as a housing and an element cover (not shown), and then installed in the exhaust system. The exhaust gas flowing through the exhaust system is introduced into the chamber 4 from the gas inlet 150 of the gas sensor element 1 via the diffusion resistance part 15 as the gas to be measured. In this state, the concentration of oxygen in the exhaust gas is detected by measuring the value of current flowing between the measurement electrode 31 and the reference electrode 32 when a voltage is applied between the electrodes.

Figure 5:
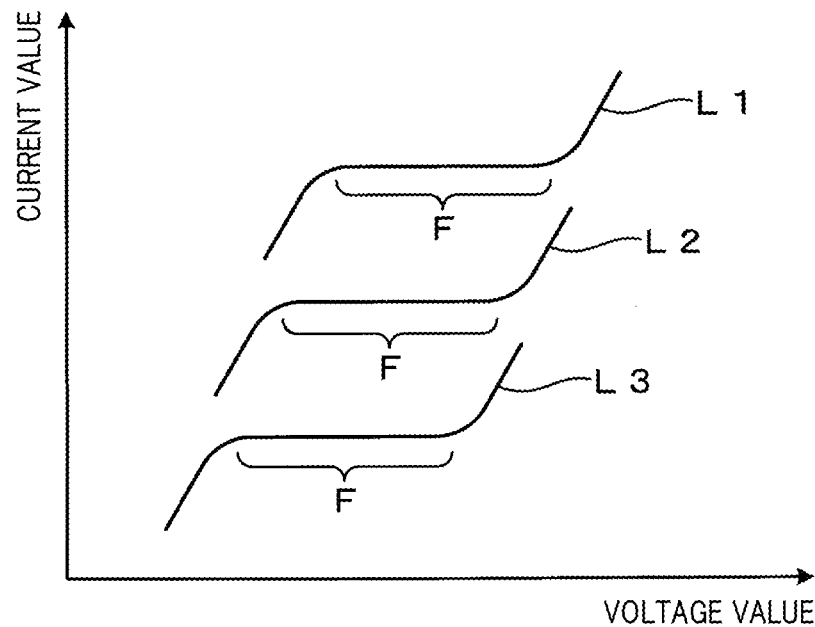
FIG. 5 is an explanatory diagram of VI curves.

The VI curves (L1 to L3) shown in FIG. 5 represent the relationship between the voltage value and the current value. That is, although the VI curve (L1 to L3) differs depending on the partial pressure of the oxygen concentration in the gas to be measured, each VI curve includes a flat part F in which the current value hardly changes with increasing voltage. Therefore, a stable current value can be obtained by applying such a voltage between the measurement electrode 31 and the reference electrode 32 that allows the current value in the flat part F (that is, the limiting current value) to be measured. The oxygen concentration can be detected from this current value, and further the air-fuel ratio can be derived.

Such current value measurement and derivation of the air-fuel ratio can be performed by, for example, an electronic control unit (ECU) installed in the vehicle based on detection signals obtained by the gas sensor element 1. The ECU can also control the application of voltage between the electrodes, energization of the heater 5, and the like.

Next, the functions and effects of this embodiment will be described.

In the gas sensor element 1, the heating center 5C of the heater 5 is located further to the tip side than an electrode center 31C of the measurement electrode 31 is. Therefore, it is easier to sufficiently increase the temperature of the solid electrolyte member 2 near the tip part of the measurement electrode 31. This means that the part of the solid electrolyte member 2 near the tip part of the measurement electrode 31 can be activated sufficiently. As a result, the gas to be measured introduced into the chamber 4 from the gas inlet 150 located on the tip side via the diffusion resistance part 15 can be treated sufficiently in the vicinity of the tip part of the measurement electrode 31. That is, the specific gas component that has reached the vicinity of the tip part of the measurement electrode 31 can be treated at a sufficient rate and transported to the reference electrode 32 side through the solid electrolyte member 2 as oxygen ions.

This allows the gas sensor element 1 to have good flatness even when the gas to be measured is introduced into the chamber 4 from the tip side.

Further, since the gas inlet 150 and the diffusion resistance part 15 are located at the tip side of the chamber 4, the responsiveness of the gas sensor element 1 is less affected by the posture in which the gas sensor (that is, the sensor module incorporating the gas sensor element 1) is attached with respect to the point at which measurement is performed. That is, as described above, the gas sensor element 1 may be provided in an exhaust system of an internal combustion engine. In such a case, the gas sensor element 1 is attached so that its longitudinal direction Y is orthogonal to the gas flow. The orientation of the gas sensor element 1 in the width direction W with respect to the direction of the gas flow may change depending on the attachment state. However, the orientation of the tip part with respect to the direction of the gas flow does not change significantly depending on the attachment state. Therefore, the responsiveness of the gas sensor element 1 having the gas inlet 150 and the diffusion resistance part 15 at the tip part is less affected by the posture in which it is attached.

In contrast, in a case where the gas inlet 150 and the diffusion resistance part 15 are formed on the outer side of the chamber 4 in the width direction W as in the gas sensor element 9 of the comparative example shown in FIGS. 8 and 9 described later, the responsiveness tends to change depending on the posture in which the gas sensor element 9 is attached with respect to the pipe. That is, since the orientation of the gas sensor element 9 in the width direction W changes depending on the posture in which it is attached, the orientation of the gas inlet 150 with respect to the gas flow changes depending on the posture in which the gas sensor element 9 is attached. When the gas inlet 150 faces the upstream side of the gas flow, introduction of the gas to be measured into the chamber 4 is facilitated. On the other hand, when it is oriented so that the direction in which the opening of the gas inlet 150 is facing is orthogonal to the gas flow, relatively less gas to be measured is introduced into the chamber 4. That is, how easily the gas to be measured can enter the chamber 4 varies depending on the posture in which the gas sensor element is attached, and the responsiveness varies accordingly.

A gas sensor element in which the gas inlet 150 is facing the tip side is less likely to have the above-described variation in responsiveness, and therefore is advantageous in terms of responsiveness. Note that the responsiveness is a quality rated by how fast the gas sensor detects changes in the concentration of the specific gas in the gas to be measured at the point where measurement is performed. The faster this detection speed, that is, the faster the response speed, the better the responsiveness.

However, in the case of a structure in which the gas is introduced into the chamber 4 from the tip side, the gas to be measured reaches the vicinity of the tip part of the measurement electrode 31 after being introduced into the chamber 4. If the temperature of the solid electrolyte member 2 near the tip part of the measurement electrode 31 is not high enough, that part may not be activated sufficiently. As a result, as shown in FIG. 6, the moving speed of oxygen ions per unit area becomes small, which causes the concentration of the specific gas to have a certain distribution in the longitudinal direction Y in the chamber 4. The arrows $O^{2-}$ shown in FIG. 6 represent the movement of oxygen ions, and the thickness of the arrows indicates the moving speed of oxygen ions per unit area. The same applies to the arrow $O^{2-}$ shown in FIG. 7 described later.

That is, oxygen cannot be pumped at a sufficient treatment rate near the tip part of the measurement electrode 31. As a result, there may be an oxygen concentration slope in the chamber 4. When there is such oxygen concentration slope, the flatness of the VI curve described above deteriorates. That is, the flat part of the VI curve is likely to be inclined.

In view of this, in the gas sensor element 1 of this embodiment, the heating center 5C of the heater 5 is located further to the tip side than the electrode center 31C of the measurement electrode 31 is. Therefore, it is easier to increase the temperature of the solid electrolyte member 2 near the tip part of the measurement electrode 31. As a result, as shown in FIG. 7, the moving speed of oxygen ions per unit area becomes sufficiently high, and oxygen can be pumped at a sufficient treatment rate near the tip part of the measurement electrode 31. This makes the oxygen concentration less inclined in the chamber 4 as shown in FIG. 7. As a result, the flatness can be improved.

Note that FIGS. 6 and 7 show a configuration in which the base end of the diffusion resistance part 15 and the tip 31A of the measurement electrode 31 are at the same position in the longitudinal direction Y for convenience of explanation. Each of these figures also includes a graph showing the distribution of oxygen concentration in the chamber 4 when the gas sensor element is exposed to a gas to be measured having an oxygen concentration of 20%. FIGS. 6 and 7 are schematic views for convenience of explanation, and the graphs shown together with them are also schematic.

Note that, even if the heating center 5C of the heater 5 is at the same position as the electrode center 31C or located further to the base end side than the electrode center 31C is, it may be possible to sufficiently increase the temperature near the tip part of the measurement electrode 31 by increasing the amount of heat generated by the heater heating part 51. However, raising the temperature near the tip of the measurement electrode 31 in such a way is disadvantageous in terms of the durability and power consumption of the heater 5, and the like. In view of this, in this embodiment, as described above, the heating center 5C is located further to the tip side than the electrode center 31C is, to effectively improve the flatness.

In this embodiment, as shown in FIGS. 1 and 2, the heating center 5C of the heater 5 is located further to the tip side than the position 31D is, which is located L/4 from the base end side of the tip 31A of the measurement electrode 31. This makes it easier to increase the temperature near the tip part of the measurement electrode 31. This further facilitates improvement in the flatness.

The tip 5A of the heater 5 is located further to the tip side than the tip 31A of the measurement electrode 31 is. This makes it possible to increase the temperature near the tip part of the measurement electrode 31 more reliably. As a result, the flatness can be further improved.

The heating base end part 5B of the heater 5 is located further to the base end side than the base end 31B of the measurement electrode 31 is. This makes it easier to maintain the temperature of the solid electrolyte member 2 high along the entire measurement electrode 31. As a result, the area of the region of the sensor cell 16 having a sufficient oxygen pumping capacity can be increased. As a result, the resistance values Ri (that is, ΔV/ΔI) before reaching the flat part in the VI curve can be suppressed. This makes it possible to enlarge the flat part of the VI curve. When the flat part is large, the durability of the gas sensor element 1 is improved, and the lifetime of the gas sensor element 1 can be extended. That is, as the gas sensor element 1 continues to be used, the resistance value Ri gradually increases and the flat part gradually becomes smaller. When the flat part becomes too small, it becomes difficult to measure the limiting current value. Therefore, making the flat part as large as possible leads to extending the lifetime of the gas sensor element 1.

Note that, in this embodiment, the measurement electrode 31 does not extend beyond the tip 5A nor the heating base end part 5B of the heater 5 in the longitudinal direction Y. This makes it possible to increase the flat part and extend the lifetime. However, in a configuration in which the heating center 5C is located further to the tip side than the electrode center 31C is, the tip 5A of the heater 5 may be on the base end side of the tip 31A of the measurement electrode 31, or the heating base end part 5B may be on the tip side of the base end 31B of the measurement electrode 31 (see, for example, part of the variations described in relation to the second, third, and fourth embodiments described later). This makes it possible to increase the temperature near the tip part of the measurement electrode 31 sufficiently and at the same time reduce power consumption.

The gas sensor element 1 of the present embodiment is configured such that the oxygen in the chamber 4 can be pumped into the duct 6 by the sensor cell 16 composed of the solid electrolyte member 2, the measurement electrode 31, and the reference electrode 32. In a gas sensor element 1 having such a configuration, in general, a difference in the applied voltage tends to affect measurement accuracy error. Therefore, improving the flatness by improving the position of the heating center 5C as described above is particularly of great significance.

Further, the gas sensor element 1 of this embodiment is an A/F sensor element. In general, it is important to activate an A/F sensor element early, and the rate at which the temperature rises tends to be high. To increase its resistance to thermal stress, the height of the chamber 4 in the stacking direction Z is reduced. For example, the height of the chamber 4 is as small as 50 μm or smaller, more preferably 30 μm or smaller. In such a case, there tends to be an oxygen concentration slope in the chamber 4 like the one described above, which is likely to be disadvantageous in terms of flatness. Therefore, improving the flatness by improving the position of the heating center 5C as described above is particularly of great significance.

As can be seen from the above, a gas sensor element having good flatness can be provided.

Comparative Example

Figure 8:
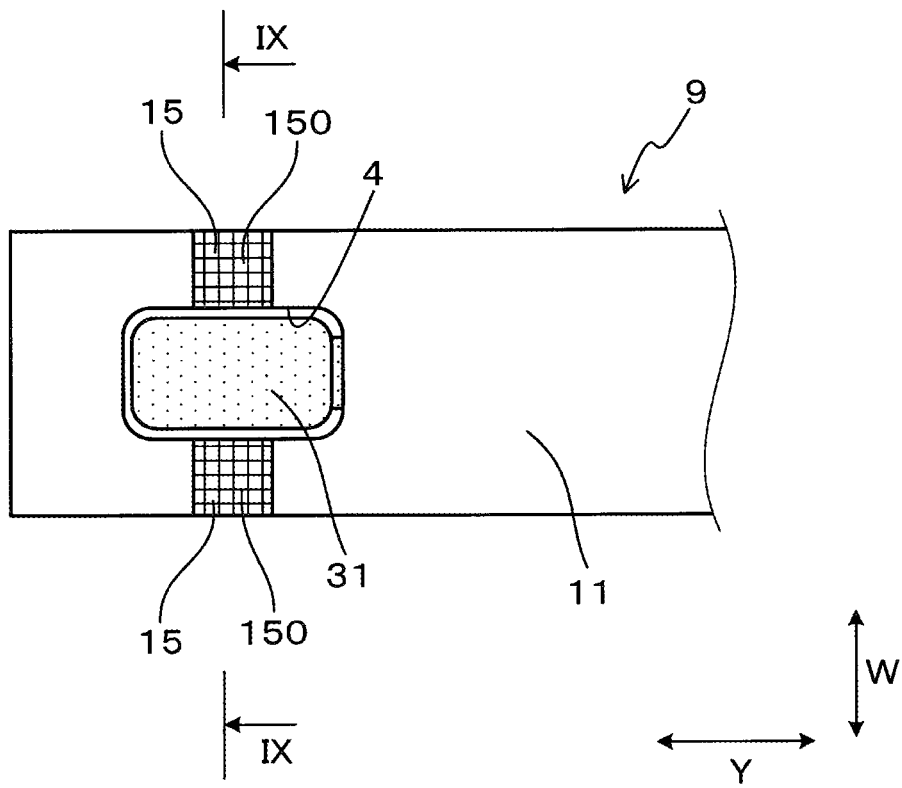
FIG. 8 is an explanatory diagram of the gas sensor element according to the comparative example.
Figure 9:
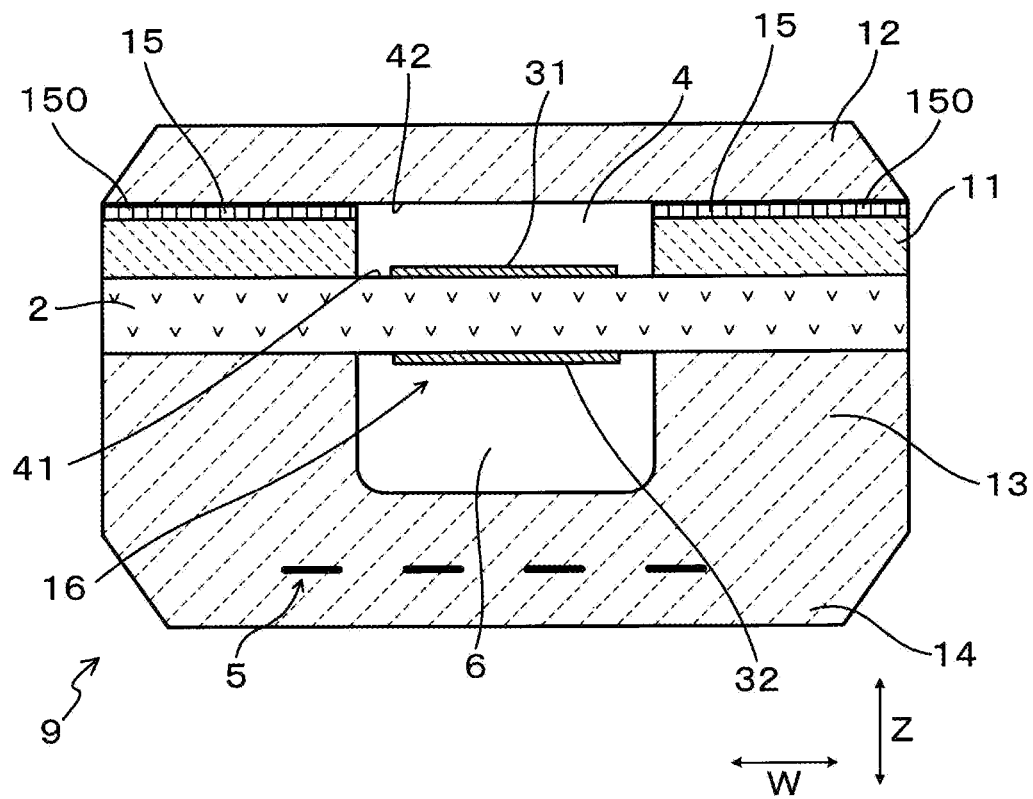
FIG. 9 is a cross-sectional view taken along line IX-IX shown in FIG. 8 as viewed in the direction indicated by the arrows.

As shown in FIGS. 8 and 9, this example is an example of a gas sensor element 9 in which the gas inlet 150 and the diffusion resistance part 15 are formed on the outer side of the chamber 4 in the width direction W.

The gas sensor element 9 does not have a gas inlet on the tip side of the chamber 4. The heating center 5C of the heater 5 is located at a position similar to the position of the electrode center 31C of the measurement electrode 31 in the longitudinal direction Y (see the curve M2 in FIG. 4).

Figure 10:
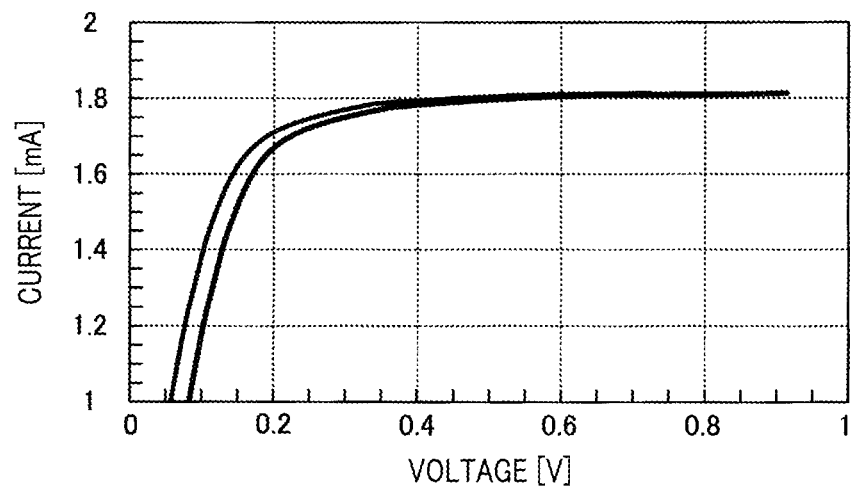
FIG. 10 is a diagram showing the VI curve of the gas sensor element according to the comparative example.
Figure 13:
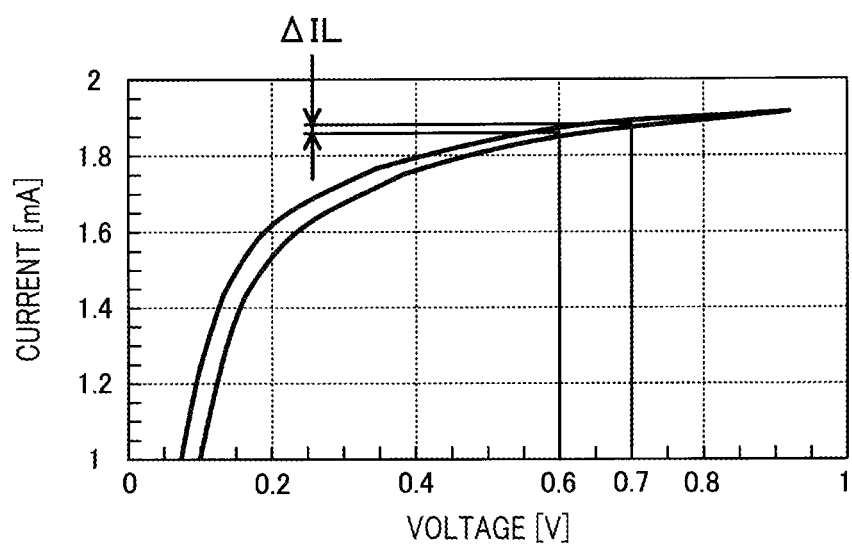
FIG. 13 is a diagram showing the VI curve of a gas sensor element whose heating center is at an electrode center.
Figure 14:
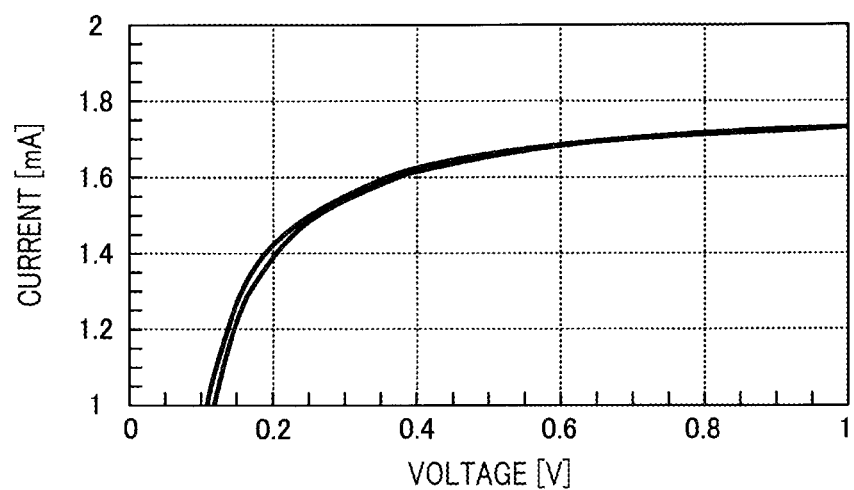
FIG. 14 is a diagram showing the VI curve of a gas sensor element whose heating center is located further to the tip side than the electrode center is.

A VI curve for the gas sensor element 9 of this example is shown in FIG. 10. This VI curve has been obtained by placing the gas sensor element in the atmosphere and measuring the changes in the output current while gradually increasing the applied voltage between the electrodes to a voltage close to 1 V and then gradually reducing the applied voltage. The output current may change slightly differently between when the voltage rises and when the voltage drops, and this difference can be seen in the VI curve of FIG. 10. FIGS. 13 and 14, which will be described later, also show the VI curves for the respective gas sensor elements that have been obtained in a similar way.

Other than the above, the configuration is the same as that of the first embodiment. Note that, among the reference signs used in this example, reference signs that are the same as those used in an earlier embodiment denote components or the like that are similar to those of the earlier embodiment unless otherwise noted.

In this example, the gas to be measured is introduced into the chamber 4 from the outer side in the width direction W. Therefore, immediately after being introduced into the chamber 4 via the diffusion resistance part 15, the gas to be measured comes into contact with the vicinity of the central part of the measurement electrode 31 in the longitudinal direction Y. Since this part is also near the heating center 5C of the heater 5, it is in a sufficiently activated state. Therefore, as shown in FIG. 10, the flatness of the VI curve is good. However, as described above, there is the problem that the responsiveness tends to vary depending on the posture in which the gas sensor element is attached to the exhaust system.

Experimental Example 1

Figure 11:
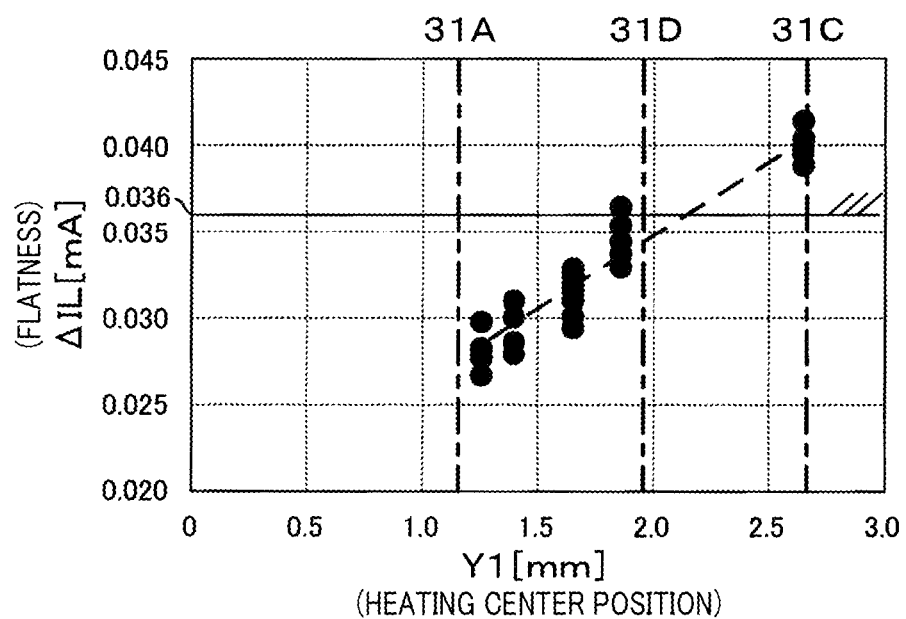
FIG. 11 is a diagram showing the measurements results of the relationship between a heating center position and flatness in Experimental Example 1.

In this example, as shown in FIG. 11, the relationship between the position of the heating center 5C of the heater 5 and the flatness was studied.

That is, various gas sensor elements having the same configuration as that of the gas sensor element 1 of the first embodiment except for the position of the heating center 5C were prepared as samples.

Figure 12:
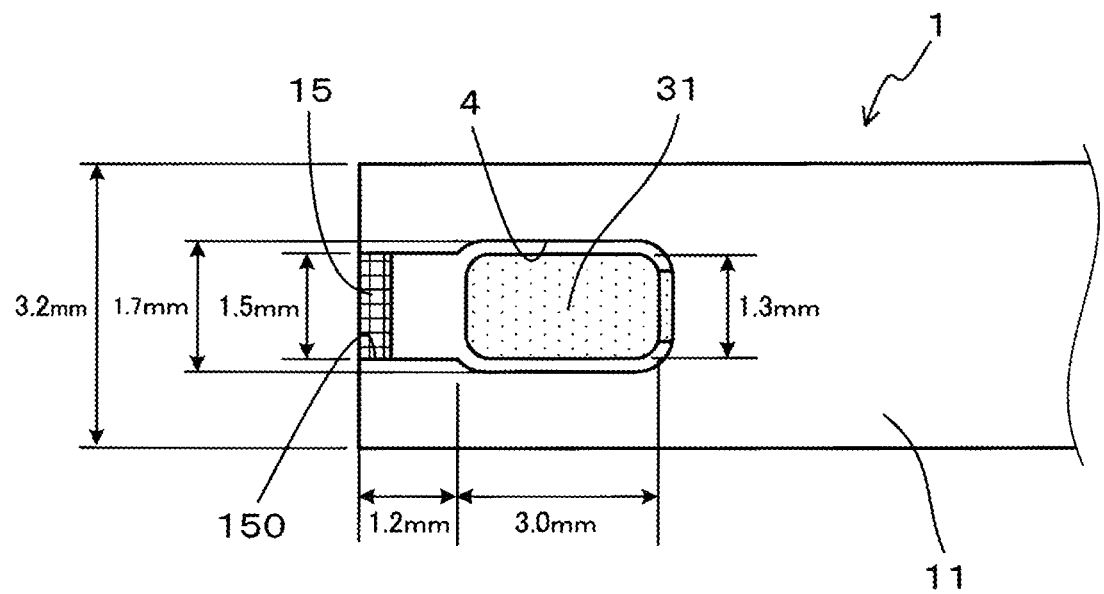
FIG. 12 is an explanatory diagram showing the dimensions of components of a gas sensor element of Experimental Example 1.

Specifically, the chamber 4, the measurement electrode 31, the gas inlet 150, the diffusion resistance part 15, and the like of each gas sensor element prepared as a sample have the dimensional relationship shown in FIG. 12. The height of the chamber 4 in the stacking direction Z was 20 μm. Samples of different levels were prepared by changing the position of the heating center 5C, that is, by changing the distance Y1 from the tip of the element in the longitudinal direction Y between 1.25 and 2.7 mm. The position at distance Y1=2.7 mm is also the position of the electrode center 31C of the measurement electrode 31. The width W2 of the heater heating part 51 was 2.5 mm.

The flatness was evaluated for each of the samples of different levels. The flatness was evaluated by acquiring the VI curve for each sample as shown in FIGS. 13 and 14. The VI curves were acquired in the same way as that of the VI curve of FIG. 10 described above. FIG. 13 shows the VI curve for the gas sensor element where Y1=2.7 mm. FIG. 14 shows the VI curve for the gas sensor element where Y1=1.25 mm.

The difference ΔIL (see FIG. 13) between the output current value at an applied voltage of 0.6 V and the output current value at an applied voltage of 0.7 V was used as a measure of flatness. Some VI curves may be slightly different between when the voltage rises and when the voltage drops. In that case, ΔIL was measured using the average of the two curves. The above measurement was performed 5 times for each level. The evaluation results are shown in FIG. 11. The alternate long and short dash lines 31A, 31D, and 31B shown in the figure indicate the distances Y1 corresponding to the positions 31A, 31D, and 31B (see FIGS. 1 and 3) of the measurement electrode 31, respectively.

As shown in the figure, the closer the position of the heating center 5C is to the tip part of the gas sensor element, the smaller the ΔIL. That is, it can be seen that the closer the position of the heating center 5C is to the tip part of the gas sensor element, the better the flatness. It can also be seen that the flatness is improved when the heating center 5C is located further to the tip side than the electrode center 31C is, as compared with when the heating center 5C is located at the electrode center 31C.

Further, when the position of the heating center 5C is located further to the tip side than the position 31D is, which is located ¼ of the total length L of the measurement electrode 31 to the tip side of the tip 31A of the measurement electrode 31, ΔIL (a measure of flatness) of 0.036 mA or smaller can be obtained. ΔI≤0.036 mA corresponds to a width of ±1% of a limiting current value of 1.8 mA of the gas sensor element used in this example. In other words, it can be considered that a gas sensor element that meets ΔI≤0.036 mA can realize such a measurement accuracy that the errors are no greater than 1%.

Second Embodiment

In this embodiment, as shown in FIGS. 15 to 18, the heating center 5C of the heater 5 is located further to the tip side than the tip 31A of the measurement electrode 31 is.

FIGS. 15 to 18 each show a variation of the pattern of the heater 5 together with its positional relationship with the measurement electrode 31.

Figure 15:
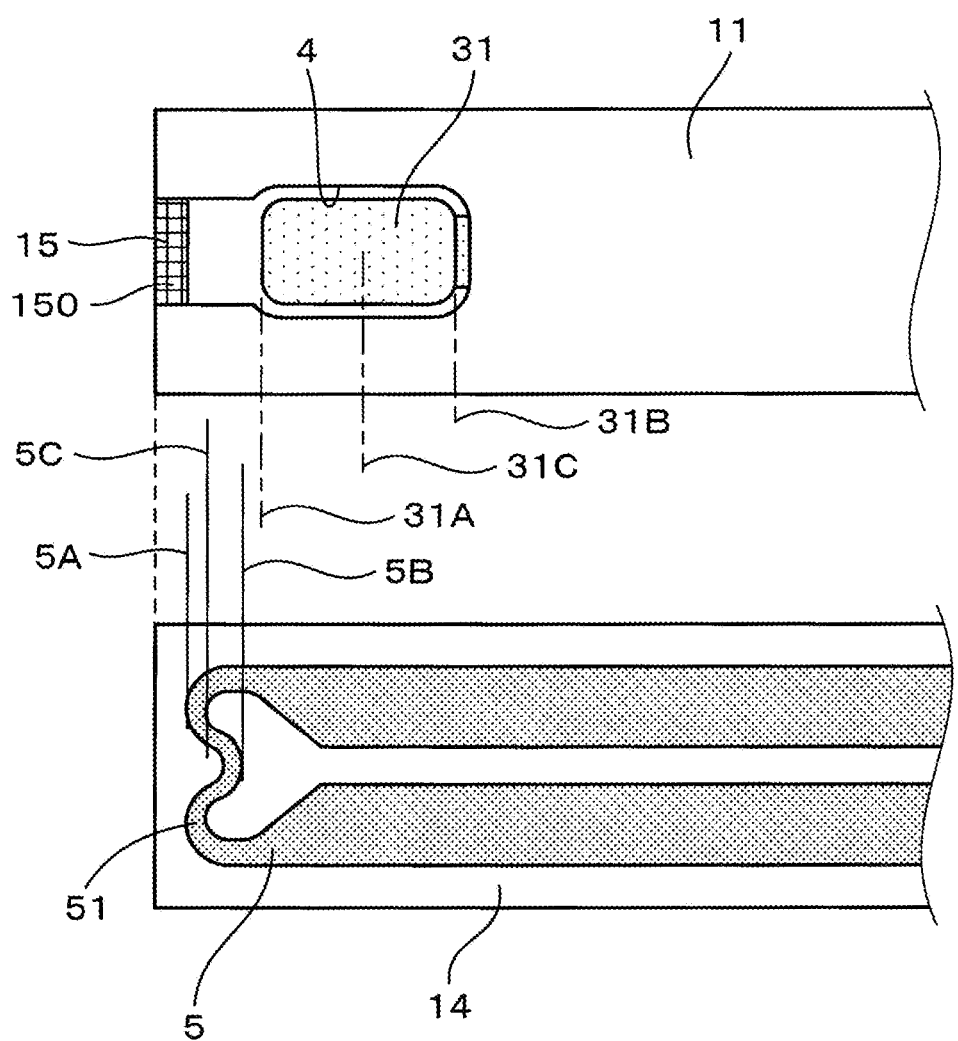
FIG. 15 is an explanatory plan view of a heater according to a second embodiment whose heating base end part is also located further to the tip side of the tip than the measurement electrode is.

The heater 5 shown in FIG. 15 is configured such that not only the heating center 5C but also the heating base end part 5B is located further to the tip side than the tip 31A of the measurement electrode 31 is.

Figure 16:
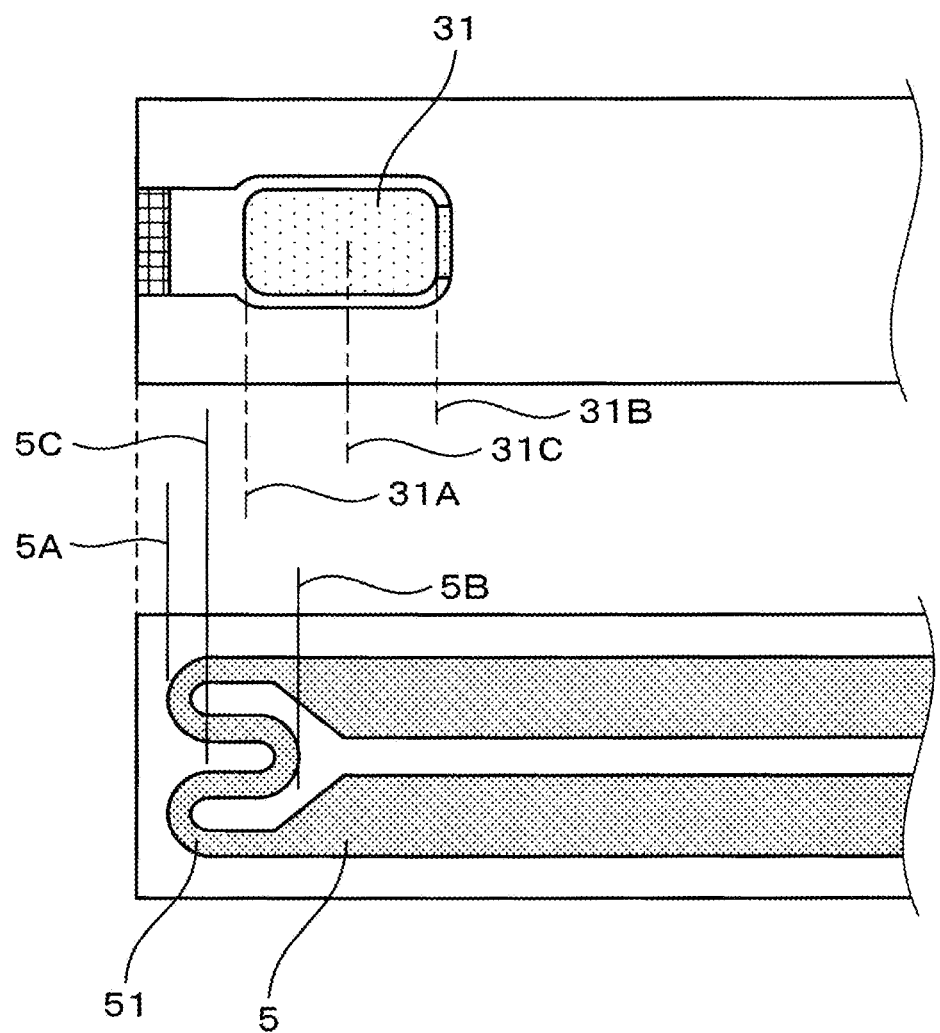
FIG. 16 is an explanatory plan view of a heater according to the second embodiment whose heating base end part is located further to the tip side than the electrode center is.

The heater 5 shown in FIG. 16 is configured such that the heating base end part 5B is located further to the base end side than the tip 31A of the measurement electrode 31 is, and further to the tip side than the electrode center 31C of the measurement electrode 31 is.

Figure 17:
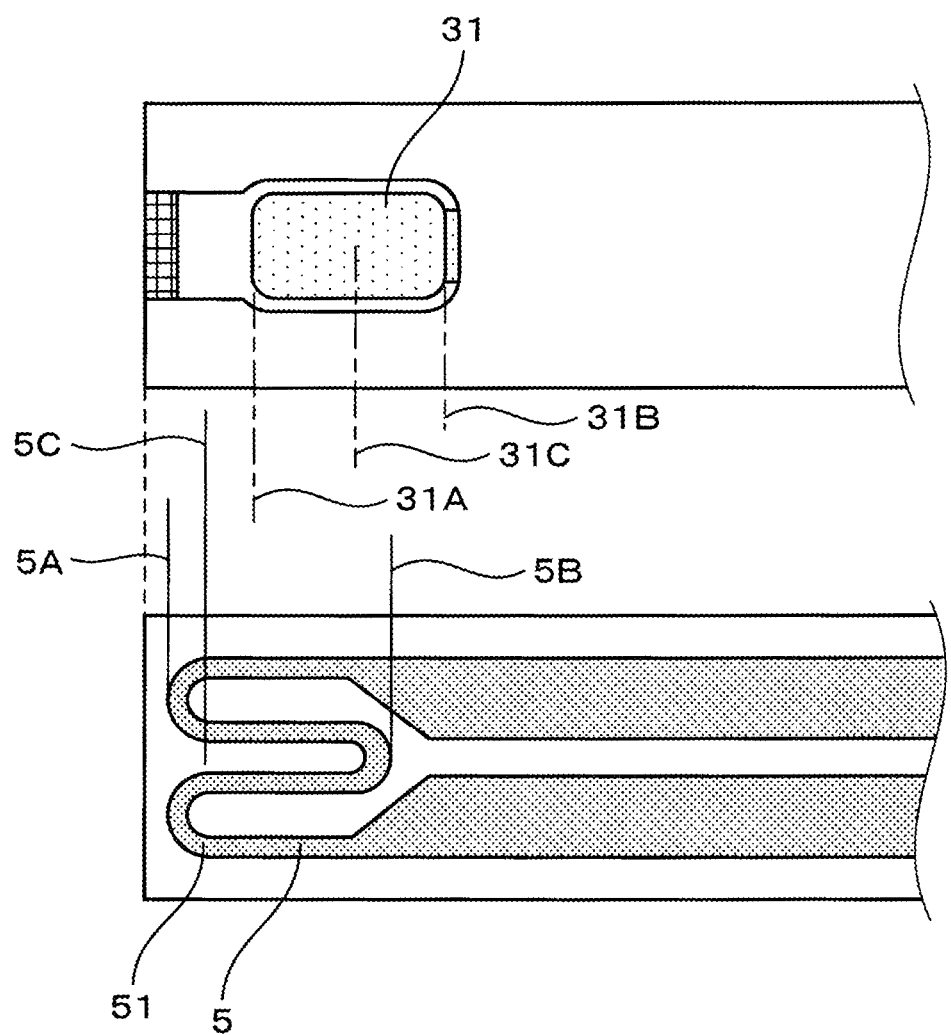
FIG. 17 is an explanatory plan view of a heater according to the second embodiment whose heating base end part is located further to the tip side than the electrode base end part is.

The heater 5 shown in FIG. 17 is configured such that the heating base end part 5B is located further to the base end side than the electrode center 31C of the measurement electrode 31 is, and further to the tip side than the base end 31B of the measurement electrode 31 is.

Figure 18:
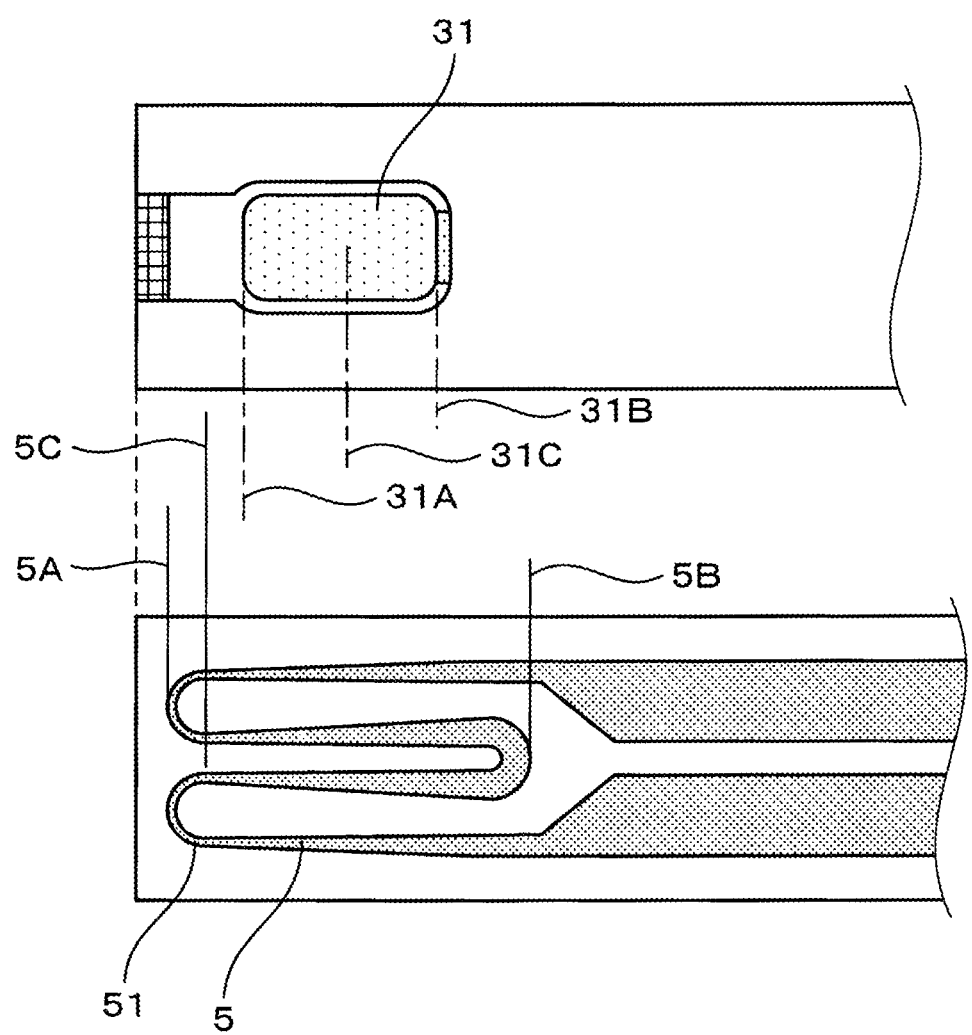
FIG. 18 is an explanatory plan view of a heater according to the second embodiment whose heating base end part is located further to the base end side than the electrode base end part is.

The heater 5 shown in FIG. 18 is configured such that the heating base end part 5B is located further to the base end side than the base end 31B of the measurement electrode 31 is. In addition, the line width of the heater pattern of the heater 5 shown in FIG. 18 decreases toward the tip part side of the heater heating part 51. This facilitates the generation of Joule heat near the tip of the heater heating part 51. This allows the heating center 5C to be located further to the tip side than the tip 31A of the measurement electrode 31 is.

Other than the above, the configuration is the same as that of the first embodiment. Note that, among the reference signs used in the second and following embodiments, reference signs that are the same as those used in an earlier embodiment denote components or the like that are similar to those of the earlier embodiment unless otherwise noted.

The temperature near the tip part of the measurement electrode 31 can be increased sufficiently in the gas sensor element of this embodiment as well. The flatness can therefore be improved. It is particularly easy to secure a wide flat part when the heater 5 shown in FIG. 18 is used. This makes it easier to extend the lifetime.

The other functions and effects are similar to those of the first embodiment.

Third Embodiment

Figure 19:
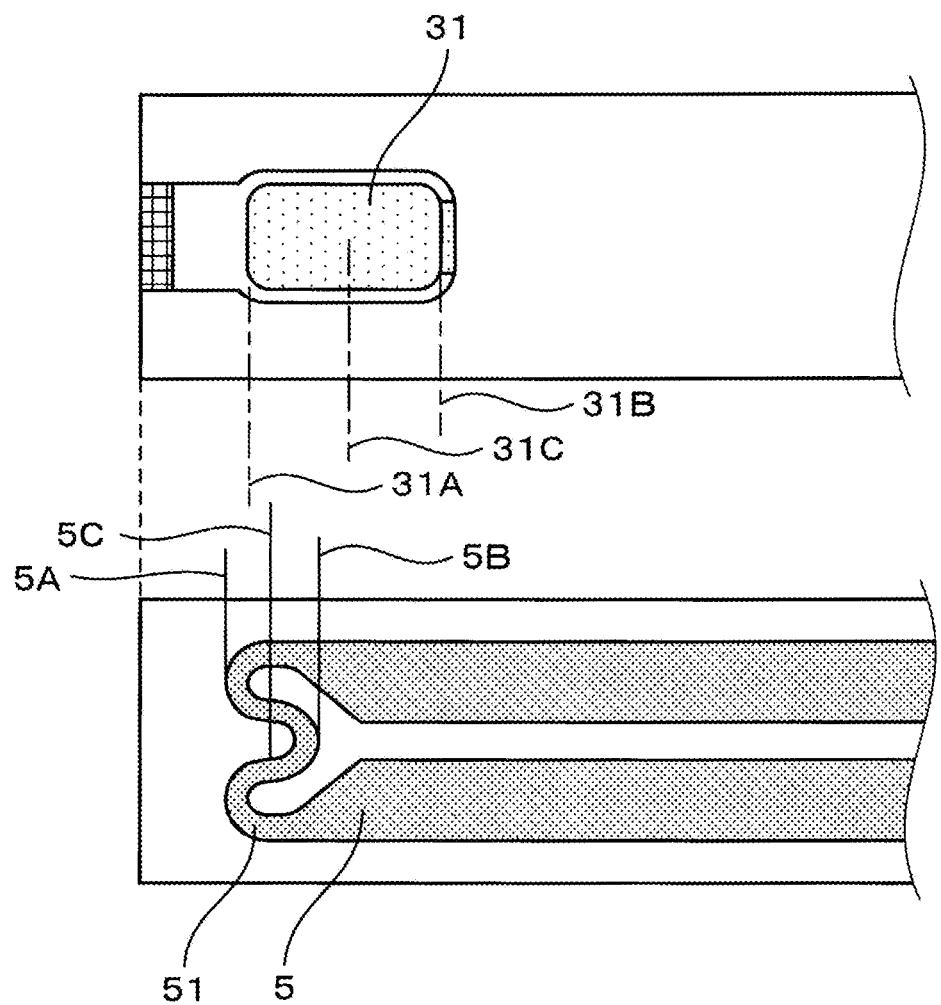
FIG. 19 is an explanatory plan view of a heater according to a third embodiment.
Figure 20:
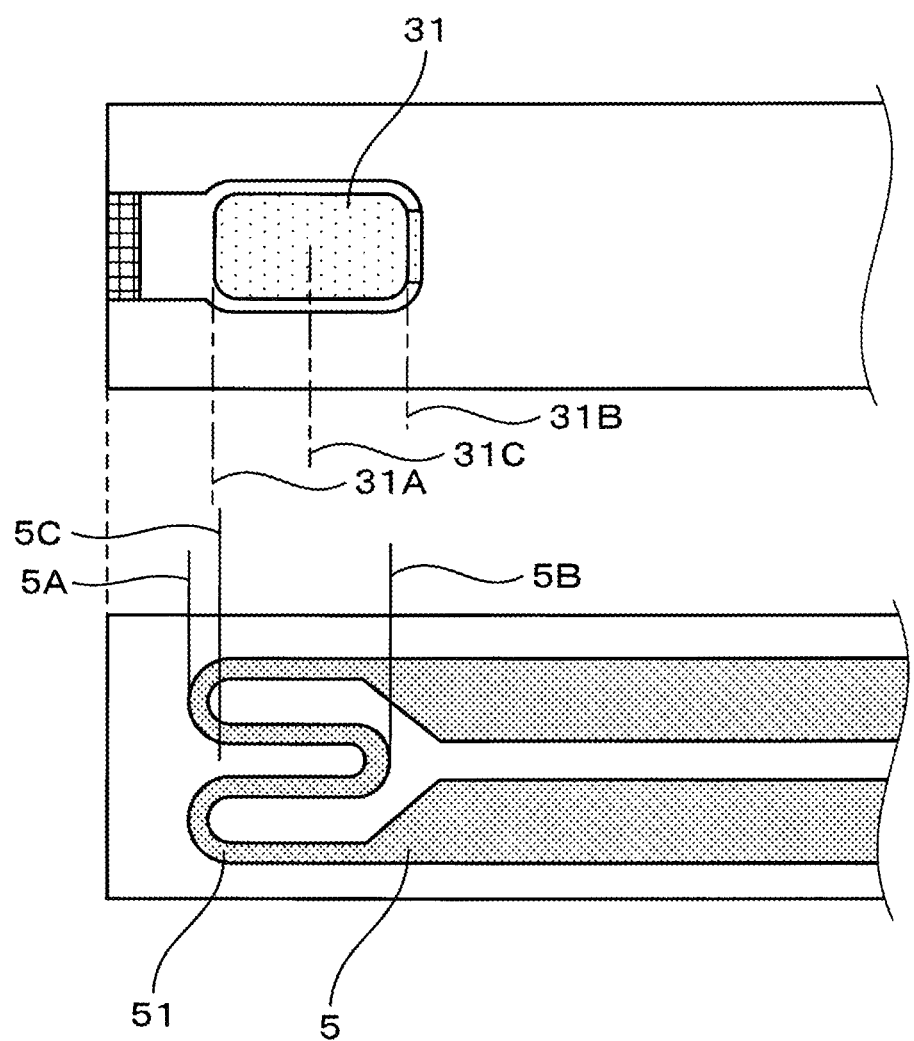
FIG. 20 is an explanatory plan view of another heater according to the third embodiment.

In this embodiment, as shown in FIGS. 19 and 20, the heating center 5C of the heater 5 is located between the tip 31A of the measurement electrode 31 and the electrode center 31C of the measurement electrode 31, and the heating base end part 5B is located further to the tip side than the base end 31B of the measurement electrode 31 is.

FIGS. 19 and 20 each show a variation of the pattern of the heater 5 together with its positional relationship with the measurement electrode 31.

The heater 5 shown in FIG. 19 is configured such that the heating base end part 5B is located further to the tip side than the electrode center 31C of the measurement electrode 31 is.

The heater 5 shown in FIG. 20 is configured such that the heating base end part 5B is located further to the base end side than the electrode center 31C of the measurement electrode 31 is, and further to the tip side than the base end 31B of the measurement electrode 31 is.

Other than the above, the configuration is the same as that of the first embodiment.

The temperature near the tip part of the measurement electrode 31 can be increased sufficiently in the gas sensor element of this embodiment as well. The flatness can therefore be improved.

The other functions and effects are similar to those of the first embodiment.

Fourth Embodiment

Figure 21:
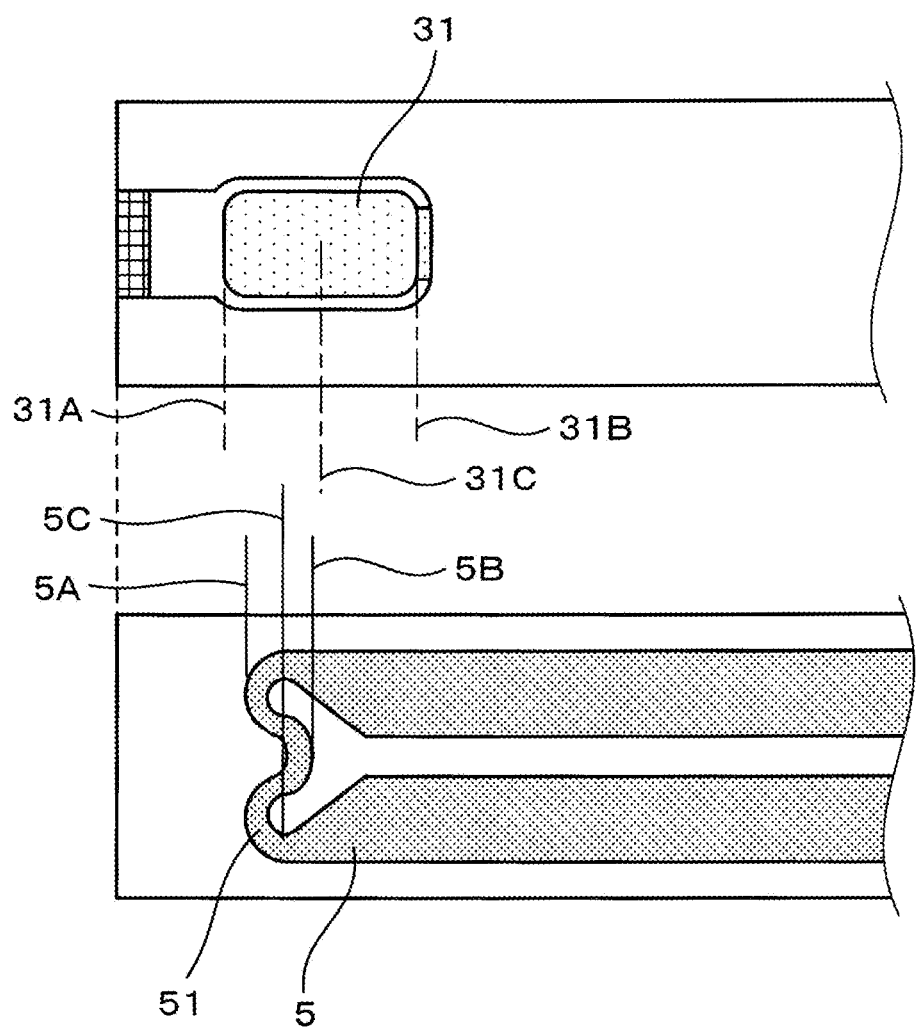
FIG. 21 is an explanatory plan view of a heater according to a fourth embodiment.
Figure 22:
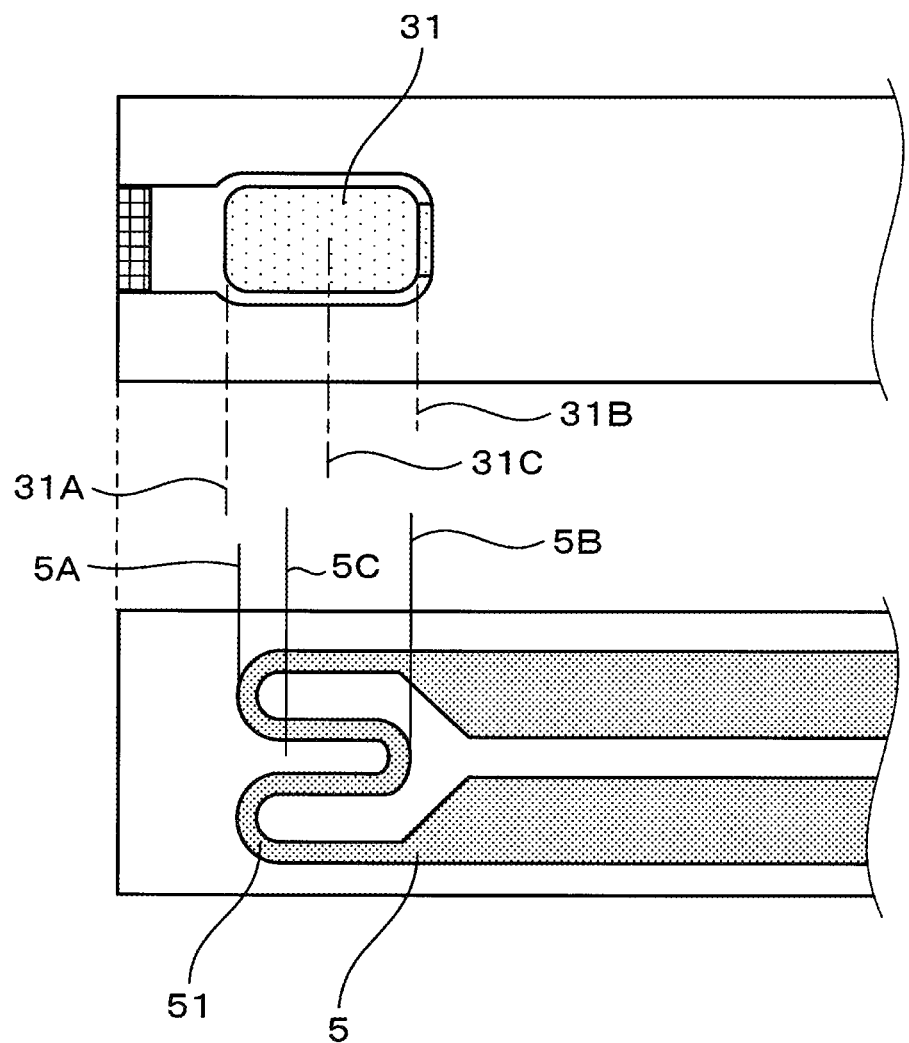
FIG. 22 is an explanatory plan view of another heater according to the fourth embodiment.
Figure 23:
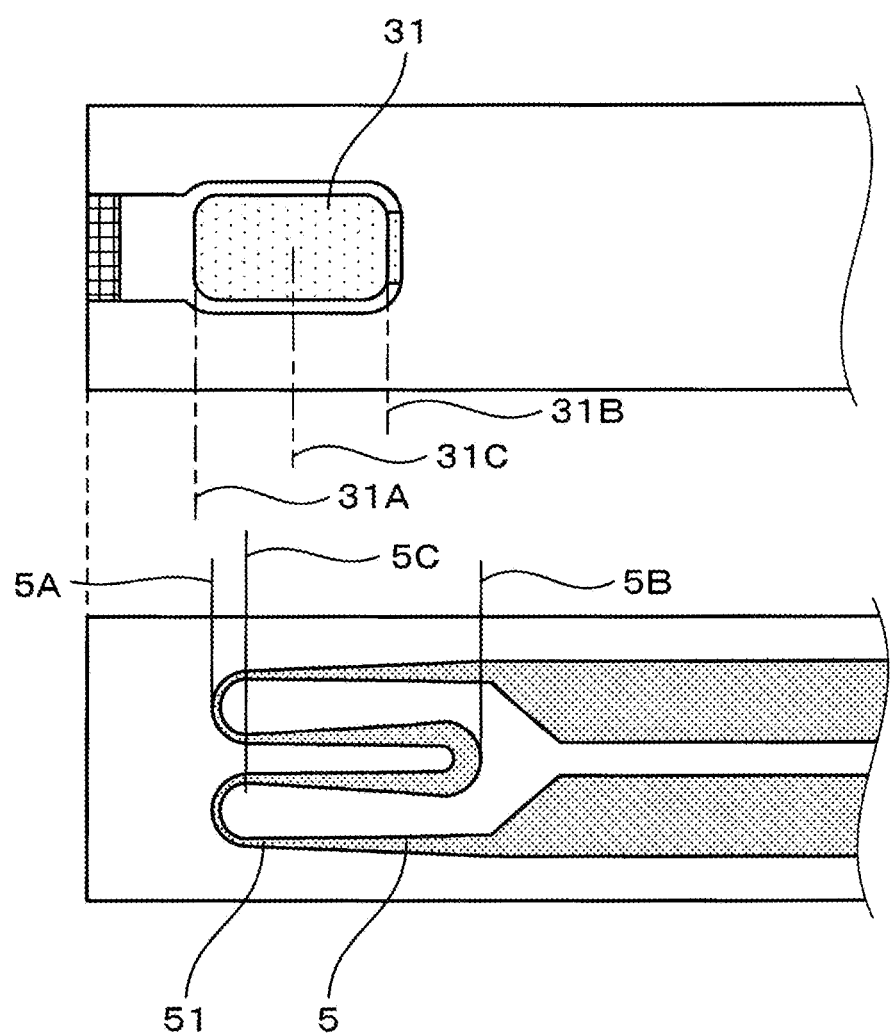
FIG. 23 is an explanatory plan view of yet another heater according to the fourth embodiment.

In this embodiment, as shown in FIGS. 21 to 23, the tip 5A of the heater 5 is located further to the base end side than the tip 31A of the measurement electrode 31 is.

FIGS. 21 to 23 each show a variation of the pattern of the heater 5 together with its positional relationship with the measurement electrode 31.

The heater 5 shown in FIG. 21 is configured such that the tip 5A and the heating base end part 5B are both located between the tip 31A and electrode center 31C of the measurement electrode 31.

The heater 5 shown in FIG. 22 is configured such that the tip 5A and the heating center 5C are located between the tip 31A and electrode center 31C of the measurement electrode 31 and the heating base end part 5B is located between the electrode center 31C and base end 31B of the measurement electrode 31.

The heater 5 shown in FIG. 23 is configured such that the tip 5A and the heating center 5C is located between the tip 31A and electrode center 31C of the measurement electrode 31, and the heating base end part 5B is located further to the base end side than the base end 31B of the measurement electrode 31 is.

Other than the above, the configuration is the same as that of the first embodiment.

The temperature near the tip part of the measurement electrode 31 can be increased sufficiently in the gas sensor element of this embodiment as well. The flatness can therefore be improved. It is particularly easy to secure a wide flat part when the heater 5 shown in FIG. 23 is used. This makes it easier to extend the lifetime.

The other functions and effects are similar to those of the first embodiment.

Fifth Embodiment

In this embodiment, as shown in FIGS. 24 to 28, variations of the pattern of the heater heating part 51 of the heater 5 are shown.

Figure 24:
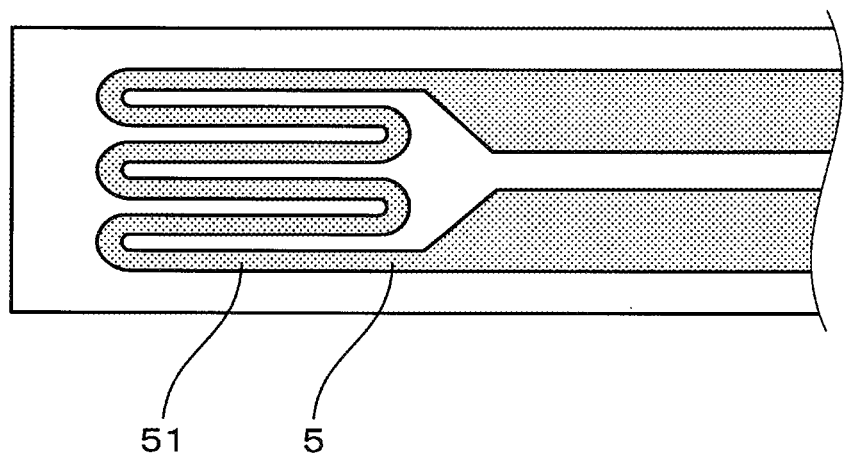
FIG. 24 is an explanatory plan view of a heater according to a fifth embodiment having a different number of folds.

The heater heating part 51 shown in FIG. 24 is a variation that has a different number of folds with respect to the heater heating part 51 shown in relation to the first embodiment (see FIG. 3). That is, the heater 5 of FIG. 24 is folded three times on the tip side and folded twice on the base end side. Heaters having various other numbers of folds can be adopted.

Figure 25:
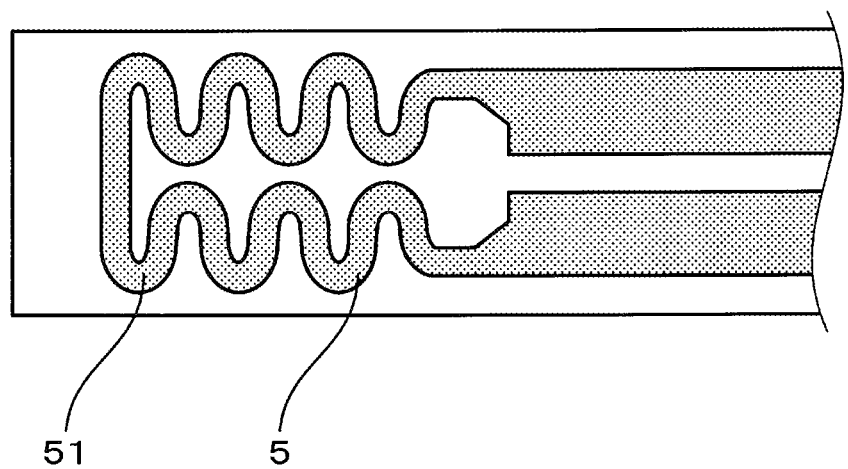
FIG. 25 is an explanatory plan view of a heater according to the fifth embodiment folded so that the wavy shape appears in the width direction.

The heater heating part 51 shown in FIG. 25 is folded so that the wavy shape appears in the width direction W. The number of folds can be changed in this case as well.

Figure 26:
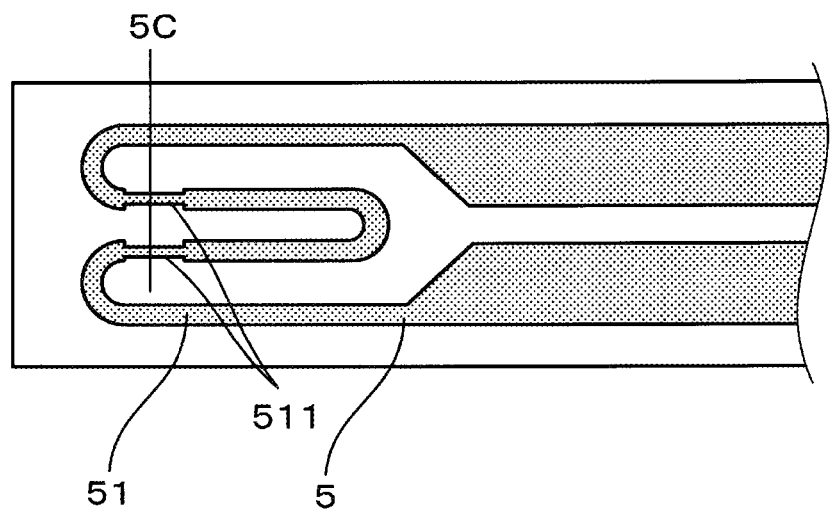
FIG. 26 is an explanatory plan view of a heater according to the fifth embodiment in which the wire includes parts with a reduced width.

The wire of the heater heating part 51 shown in FIG. 26 includes parts having a particularly reduced width. This makes it possible to position the heating center 5C between the tips and the base ends of thin wire parts 511 having a reduced wire width.

Figure 27:
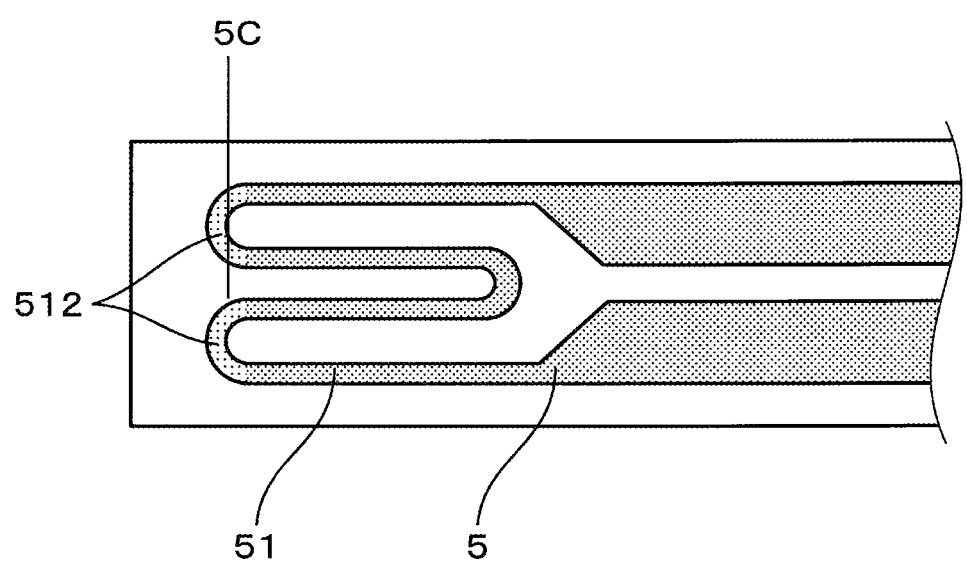
FIG. 27 is an explanatory plan view of a heater according to the fifth embodiment in which the wire includes parts with a reduced thickness.

The wire of the heater heating part 51 shown in FIG. 27 includes having a reduced thickness. This makes it possible to position the heating center 5C between the tips and the base ends of flattened wire parts 512 having a reduced wire thickness.

Figure 28:
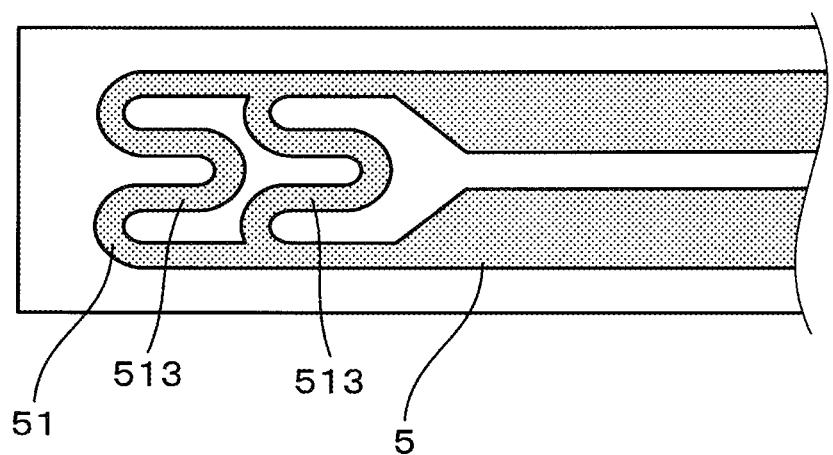
FIG. 28 is an explanatory plan view of a heater according to the fifth embodiment including a plurality of branch wire parts.

The heater heating part 51 shown in FIG. 28 has a plurality of branch wire parts 513 connected in parallel to each other. FIG. 28 shows a case where there are two branch wire parts 513, but it is also possible to provide three or more branch wire parts 513.

Sixth Embodiment

Figure 29:
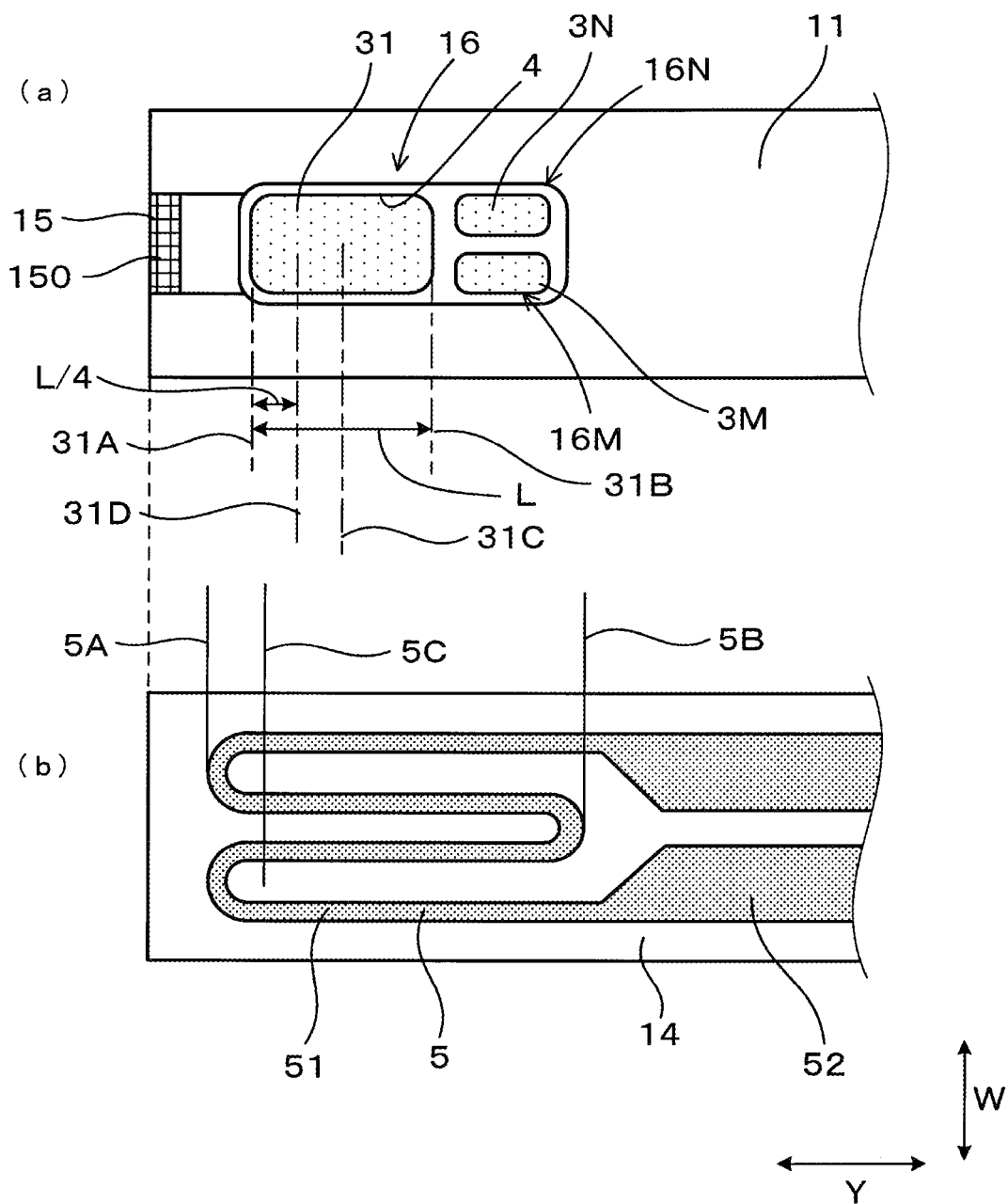
FIG. 29 is an explanatory net of a gas sensor element according to a sixth embodiment including a plurality of sensor cells.

As shown in FIG. 29, in this embodiment, the gas sensor element 1 is provided with a plurality of electrochemical cells (16, 16N, and 16M).

In this embodiment, a plurality of electrodes are formed on the face of the solid electrolyte member 2 of the gas sensor element 1 on the chamber 4 side.

Each of these plurality of electrodes forms an electrochemical cell together with the reference electrode 32 and the solid electrolyte member 2. In other words, the gas sensor element 1 of this embodiment has a plurality of electrochemical layers. When a plurality of electrochemical cells are provided as in this embodiment, the heating center 5C of the heater 5 is defined with respect to the measurement electrode 31 forming the sensor cell (electrochemical cell) 16 closest to the diffusion resistance part 15 in the longitudinal direction Y.

In this embodiment, the sensor cell 16 located furthest to the tip side in the longitudinal direction Y is also a pump cell for pumping the oxygen in the chamber 4 into the duct 6. This pump cell adjusts the oxygen concentration in the chamber 4. The oxygen concentration in the exhaust gas is measured by measuring the value of the current flowing during this pumping, and measuring the limiting current value. Then, based on this oxygen concentration, the air-fuel ratio (that is, A/F) of the internal combustion engine can be measured.

The electrochemical cells other than the sensor cell 16 can be, for example, a cell for NOx 16N and a monitoring cell 16M. The cell for NOx 16N has an electrode for NOx 31N that has activity for NOx (that is, nitrogen oxides). The monitoring cell 16M has a monitoring electrode 31M that has activity for oxygen. The monitoring cell 16M detects the oxygen concentration in the chamber 4. The NOx concentration in the gas to be measured can be detected based on the oxygen ion current flowing through the cell for NOx 16N and the oxygen ion current flowing through the monitoring cell 16M.

That is, the gas sensor element of this embodiment combines the function to detect the air-fuel ratio (that is, A/F) and the function to detect the NOx concentration.

As described above, the heating center 5C is located further to the tip side than the electrode center 31C of the measurement electrode 31 of the sensor cell 16 is (which is also a pump cell), which is the electrochemical cell located furthest to the tip side. The heating base end part 5B is located further to the base end side than the base end 31B of the measurement electrode 31 is. The heating base end part 5B is located further to the base end side than the base end of the electrode for NOx 31N is. Further, the heating base end part 5B is located further to the base end side than the base end of the monitoring electrode 31M is.

Other than the above, the configuration is the same as that of the first embodiment.

Even when the gas sensor element 1 has a plurality of electrochemical cells as in this embodiment, the gas sensor element can have a good flatness by positioning the heating center 5C to the tip side of the electrode center 31C of the measurement electrode 31.

The other functions and effects are similar to those of the first embodiment.

The present disclosure is not limited to the above embodiments, and can be applied to various embodiments without departing from the gist of the present disclosure.

Although the present disclosure is described based on embodiments, it should be understood that the present disclosure is not limited to the embodiments and structures. The present disclosure encompasses various variations as well as changes within the scope of equivalence. In addition, the scope and the spirit of the present disclosure encompass various combinations and modes, and other combinations and modes including only one element thereof, and combinations and modes having more or less elements.

What is claimed is:

1. A limiting current-type gas sensor element including a plurality of stacked ceramic layers and configured to output a limiting current value which depends on a concentration of a specific gas in a gas to be measured when a certain voltage is applied, the gas sensor element comprising:
    a solid electrolyte member having oxygen ion conductivity;
    a heater that heats the solid electrolyte member;
    a measurement electrode and a reference electrode provided on the solid electrolyte member;
    a chamber facing the measurement electrode and into which the gas to be measured is introduced;
    a gas inlet located to a tip side of the chamber in a longitudinal direction of the gas sensor element; and
    a diffusion resistance part provided in the gas inlet, wherein
    a heating center of the heater is located further to the tip side than an electrode center of the measurement electrode is; and
    the heating center is located further to a base end side of the gas sensor element than a tip of the measurement electrode is in the longitudinal direction.

2. The gas sensor element according to claim 1, wherein the heating center of the heater is located further to the tip side than a position is, that is L/4 from a base end side of the tip of the measurement electrode, where L is a total length of the measurement electrode in the longitudinal direction.

3. The gas sensor element according to claim 1, wherein that a tip of the heater is located further to the tip side than the tip of the measurement electrode is.

4. The gas sensor element according to claim 1 wherein
    a heating base end part of the heater is located further to the base end side of the gas sensor element than a base end of the measurement electrode is, and
    the heating base end part is a part located furthest to the base end side in a section of the heater that has a temperature of 600° C. or higher when a temperature of the heating center is maintained at 700° C.

5. The gas sensor element according to claim 1, wherein the gas to be measured is an exhaust gas of an internal combustion engine that burns a mixture of air and fuel, and the gas sensor element is an A/F sensor element configured to be capable of measuring a mixing ratio of the air and fuel in the mixture based on the limiting current value.

6. The gas sensor element according to claim 1, further comprising:
    a duct which the reference electrode faces, characterized in that oxygen in the chamber is pumped into the duct by a sensor cell composed of the solid electrolyte member, the measurement electrode, and the reference electrode.

7. The gas sensor element according to claim 1, wherein
    a tip of the heater is located further to the tip side than the tip of the measurement electrode is; and
    a heating base end part of the heater is located further to the base end side of the gas sensor element than a base end of the measurement electrode is.

8. The gas sensor element according to claim 7, wherein
    the heater includes a plurality of straight portions extending in the longitudinal direction and first and second curved portions located on opposite ends of the straight portions in the longitudinal direction;
    the tip of the heater is formed by the first curved portion of the heater; and
    a heating base end part of the heater is formed by the second curved portion of the heater.

9. The gas sensor element according to claim 1, wherein a heating base end part of the heater is located further to the tip side than a base end of the measurement electrode is.

10. The gas sensor element according to claim 1, wherein a tip of the heater is located further to the base end side of the gas sensor element than the tip of the measurement electrode is.

* * * * *